US012489872B2

(12) United States Patent
Leshem et al.

(10) Patent No.: US 12,489,872 B2
(45) Date of Patent: Dec. 2, 2025

(54) COMPRESSED ACQUISITION OF MICROSCOPIC IMAGES

(71) Applicant: SCOPIO LABS LTD., Tel Aviv (IL)

(72) Inventors: Ben Leshem, Tel Aviv (IL); Eran Small, Yahud (IL); Itai Hayut, Tel Aviv (IL); Erez Na'Aman, Tel Aviv (IL); Eyal Ben-Bassat, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 466 days.

(21) Appl. No.: 17/304,331

(22) Filed: Jun. 18, 2021

(65) Prior Publication Data

US 2021/0392304 A1 Dec. 16, 2021

Related U.S. Application Data

(63) Continuation of application No. PCT/IL2019/051388, filed on Dec. 19, 2019.
(Continued)

(51) Int. Cl.
*H04N 9/03* (2023.01)
*G02B 21/06* (2006.01)
(Continued)

(52) U.S. Cl.
CPC ............. *H04N 9/03* (2023.01); *G02B 21/241* (2013.01); *G02B 21/367* (2013.01); *G06T 3/14* (2024.01);
(Continued)

(58) Field of Classification Search
CPC ........ H04N 9/03; H04N 25/11; H04N 25/611; G06T 7/38; G06T 3/0068; G02B 21/241; G02B 21/367; G02B 21/06
See application file for complete search history.

(56) References Cited

U.S. PATENT DOCUMENTS

| 5,965,875 A | 10/1999 | Merrill |
| 2009/0060365 A1 | 3/2009 | Nagata |

(Continued)

FOREIGN PATENT DOCUMENTS

| EP | 3145171 | 3/2017 |
| JP | 59028144 | 2/1984 |

(Continued)

OTHER PUBLICATIONS

International Search Report and Written Opinion for PCT/IL2019/051388, 16 pages (Apr. 27, 2020).
(Continued)

*Primary Examiner* — Andrew W Bee
*Assistant Examiner* — Devin J Dhooge
(74) *Attorney, Agent, or Firm* — FisherBroyles, LLP; John K. Shimmick

(57) ABSTRACT

A microscope for computational imaging may include an illumination source configured to illuminate a sample with a plurality of wavelengths, an image sensor, an objective lens to image the sample onto the image sensor, and a processor operatively coupled to the illumination assembly and the image sensor. The processor may be configured to acquire a first image dataset from the sample illuminated using a first set of illumination conditions at a first wavelength. The processor may also be configured to acquire a second image dataset from the sample illuminated using a second set of illumination conditions having a second number of illumination conditions at a second wavelength. The second set of illumination conditions comprises fewer illumination conditions than the first set in order to decrease acquisition time. The processor may be configured to combine the first and second image datasets into a computationally reconstructed image of the sample.

21 Claims, 14 Drawing Sheets

Related U.S. Application Data

(60) Provisional application No. 62/783,527, filed on Dec. 21, 2018.

(51) Int. Cl.
*G02B 21/24* (2006.01)
*G02B 21/36* (2006.01)
*G06T 3/14* (2024.01)
*G06T 7/38* (2017.01)
*H04N 25/11* (2023.01)
*H04N 25/611* (2023.01)

(52) U.S. Cl.
CPC .............. *G06T 7/38* (2017.01); *H04N 25/11* (2023.01); *H04N 25/611* (2023.01); *G02B 21/06* (2013.01)

(56) References Cited

U.S. PATENT DOCUMENTS

| | | | |
|---|---|---|---|
| 2011/0025905 A1 | 2/2011 | Tanaka | |
| 2011/0262053 A1 | 10/2011 | Strandemar | |
| 2011/0286634 A1* | 11/2011 | Imamura | H04N 23/951 382/106 |
| 2013/0038766 A1 | 2/2013 | Perlman | |
| 2014/0009662 A1 | 1/2014 | Toda | |
| 2014/0050302 A1 | 2/2014 | Dennerlein | |
| 2015/0312503 A1 | 10/2015 | Sato | |
| 2015/0317508 A1 | 11/2015 | Zheng | |
| 2016/0088205 A1 | 3/2016 | Horstmeyer | |
| 2016/0337623 A1 | 11/2016 | Onishi | |
| 2016/0341947 A1 | 11/2016 | Sato | |
| 2017/0085789 A1 | 3/2017 | Tatsuta | |
| 2017/0163971 A1* | 6/2017 | Wang | G06T 1/0007 |
| 2017/0168285 A1 | 6/2017 | Ozcan | |
| 2017/0176338 A1* | 6/2017 | Wu | G01N 21/6428 |
| 2018/0120553 A1* | 5/2018 | Leshem | G02B 21/34 |
| 2018/0329194 A1* | 11/2018 | Small | G02B 21/367 |
| 2019/0387964 A1 | 12/2019 | Kobayashi | |

FOREIGN PATENT DOCUMENTS

| | | |
|---|---|---|
| JP | H06331906 | 12/1994 |
| JP | 2006304036 | 11/2006 |
| JP | 2009053455 | 3/2009 |
| JP | 2009253413 | 10/2009 |
| JP | 2015219282 | 12/2015 |
| JP | 2016213715 | 12/2016 |
| WO | 2017081539 | 5/2017 |
| WO | 2017081540 | 5/2017 |
| WO | 2017081541 | 5/2017 |
| WO | 2017081542 | 5/2017 |
| WO | 2018078447 | 5/2018 |
| WO | 2018078448 | 5/2018 |
| WO | 2018163500 | 9/2018 |
| WO | 2019077610 | 4/2019 |
| WO | 2019097523 | 5/2019 |
| WO | 2019097524 | 5/2019 |
| WO | 2020129064 | 6/2020 |
| WO | 2021095037 | 5/2021 |

OTHER PUBLICATIONS

U.S. Pat. No. 4,611,247, an English member of the same patent family as JP 59-028144.

Gao L, Liang J, Li C, Wang LV. Single-shot compressed ultrafast photography at one hundred billion frames per second. Nature. Dec. 4, 2014;516(7529):74-7. doi: 10.1038/nature14005. PMID: 25471883; PMCID: PMC4270006.

Anonymous: "Night Sight: Seeing in the Dark on Pixel Phones," retrieved from https://research.google/blog/night-sight-seeing-in-the-dark-on-pixel-phones, pp. 1-13, XP093248021 (Nov. 14, 2018).

Hewitson, Tim, "Chapter 16: Software-Based Stacking Techniques to Enhance Depth of Field and Dynamic Range in Digital Photomicrography"; in: "Histology Protocols," Humana Press, XP093248205, pp. 1-22 (Jan. 1, 2010).

* cited by examiner

COMPRESSED ACQUISITION OF MICROSCOPIC IMAGES

RELATED APPLICATIONS

This application is a continuation of International Application No. PCT/IL2019/051388, filed Dec. 19, 2019, published as WO 2020/129064 on Jun. 25, 2020, which claims the benefit under 35 U.S.C. § 119(e) of U.S. Provisional Patent Application No. 62/783,527, filed Dec. 21, 2018, the disclosures of which are incorporated, in their entirety, by this reference.

BACKGROUND

In computational imaging, high-resolution computationally reconstructed images of an object may be produced from a series of low-resolution images taken with varying illuminations. This approach has the benefit of providing high resolution computationally reconstructed images of a sample from an imaging system with lesser resolution. Computational imaging can be used to generate high resolution computationally reconstructed color images low resolution images. However, there is a less than ideal overhead associated with computation imaging because of the time required for gathering multiple low-resolution images and computationally producing a high-resolution image from the gathered information. Because the number of low-resolution images may typically determine the quality and resolution of the output high-resolution image, it may be difficult to reduce the overhead without substantially degrading the output image in at least some instances. For applications which require multiple fields of view, the overhead may be particularly significant.

Because computational imaging algorithms often rely on a relatively good model of the physical system (which may be known, learned or implied), these algorithms may be wavelength dependent. This wavelength dependence may create further overhead in some instances, for example when each wavelength is processed separately. The reconstruction time may be duplicated for each wavelength, and in some instances, the acquisition time may be duplicated. For example, color imaging processes may operate with three color channels (e.g., red, green, and blue, or "RGB") which may result in a multiplication of the acquisition times by a factor of three and of the computational reconstruction time by a factor of three. These channels may also be used in another color space, such as Lab (e.g., CIELab), YCbCr, YUV, or the like, which may further add to the computational reconstruction and/or acquisition times.

In light of the above, it would be desirable to reduce the acquisition and/or reconstruction times without significantly degrading the quality and utility of at the output computationally reconstructed image.

SUMMARY

As will be described in greater detail below, the instant disclosure describes various systems and methods for compressed acquisition of microscopic images by acquiring a first image dataset of a sample using a first set of illumination conditions for a first wavelength, and a second image dataset of the sample using a second set of illumination conditions for a second wavelength. The first set of illumination conditions may include a greater number of illumination conditions than the second set of illumination conditions. The first and second image datasets may be combined into a computationally reconstructed image of the sample. Because the second set of illumination conditions is smaller than the first set of illumination conditions, this approach may decrease the acquisition time, reconstruction time, storage requirements, and other costs when compared to conventional approaches. In addition, because the first wavelength may be selected to produce images containing more information than images of the second wavelength, the resultant reconstructed image may not contain significantly less information than reconstructed images from conventional approaches.

In addition, the systems and methods described herein may improve the functioning of a computing device (e.g., connected to or integrated with a microscope) by reducing dataset sizes and more efficiently computing reconstructed images. These systems and methods may also improve the field of microscopic imaging by improving acquisition times.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
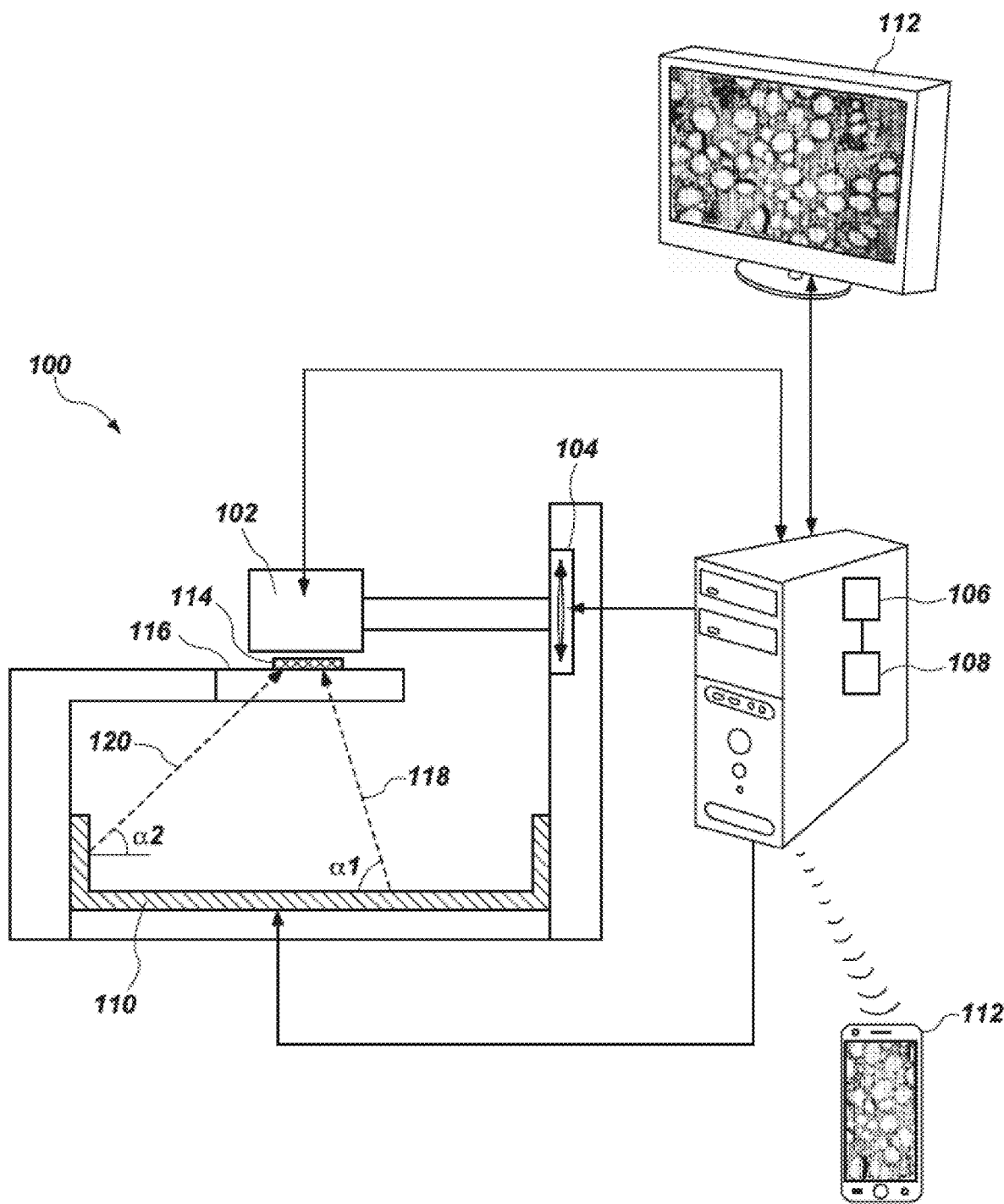
FIG. 1 shows a diagram of an exemplary microscope, in accordance with some embodiments.

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Because cone cells in the human eye may produce a maximal visual acuity at approximately 555 nm, in certain illumination conditions the highest human perceivable resolution may be a green color channel. For other color channels, human eyes may not perceive resolutions as high as with the green channel. In some embodiments the computationally reconstructed image comprises a higher spatial frequency bandwidth for a first wavelength, e.g. green, and a lower spatial frequency bandwidth for a second wavelength e.g. red. The user may perceive these images as having the higher spatial frequency bandwidth of the first wavelength while perceiving the image as a color image. Although reference is made to a color image, this approach can be similarly applied to computationally reconstructed images with only two wavelengths, which may comprise an ultraviolet wavelength or an infrared wavelength. The embodiments disclosed herein may improve the imaging time (e.g., the acquisition time and the reconstruction time) of computational imaging systems by processing images in a manner adjusted to different color channels (e.g., wavelengths). This approach may reduce a number of images being acquired and/or used for reconstruction. In addition, different reconstruction processes may be used for different wavelengths.

In some embodiments based on the sensitivity of the human eye to different wavelengths, a number of low-resolution images acquired may vary for different wavelengths. For example, in one embodiment, the systems described herein may perform computational imaging using the green channel, red channel, and blue channel. Because of the human eye's sensitivity to the green channel, the systems described herein may acquire multiple images in the green channel and acquire fewer images (such as a single image) in each of the red and blue channels without significantly degrading human perception of the resultant reconstructed image. In some embodiments, the systems described herein may acquire multiple images in the green channel for reconstruction of a high-resolution computational image in the green channel, while acquiring fewer images in the red and blue channels for reconstruction of a mid-resolution image in the red and blue channels.

Slides of biological and other samples may hold more information in certain color channels than others. For instance, capturing high-resolution details using the green channel may be sufficient for capturing the information. When there are certain stains or other properties, there may be a benefit to capturing high-resolution in other channels, instead of or in addition to the green channel. This approach may be applied to scenarios using other wavelengths (e.g., Infra-Red (IR) wavelengths, Ultra Violet (UV) wavelengths, and/or fluorescence wavelengths).

Figure 2A:
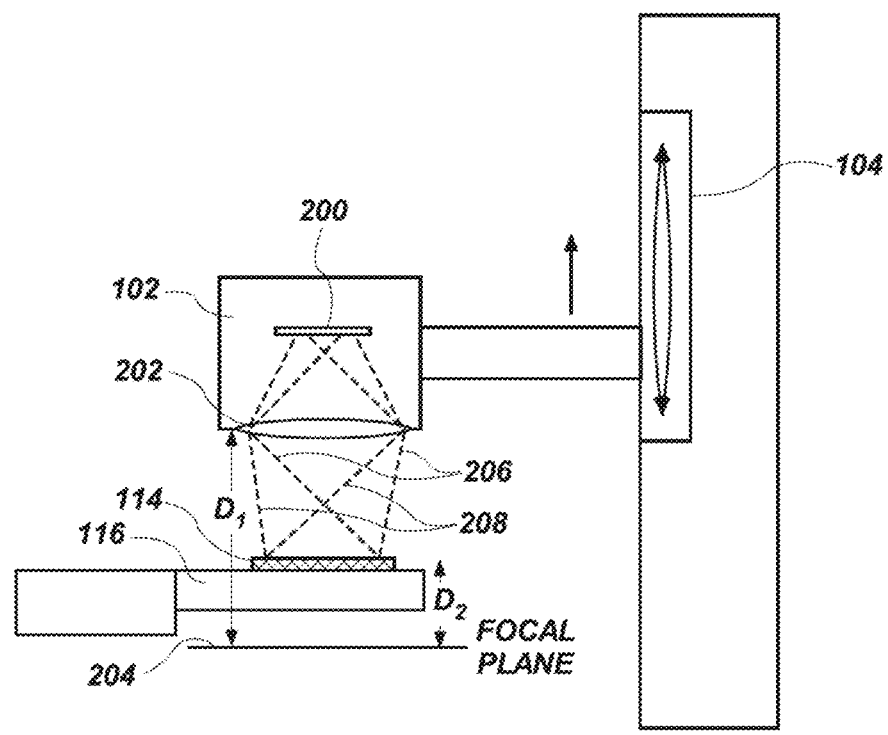
FIG. 2A shows a diagram of the optical paths of two beam pairs when the microscope of FIG. 1 is out of focus, in accordance with some embodiments.
Figure 2B:
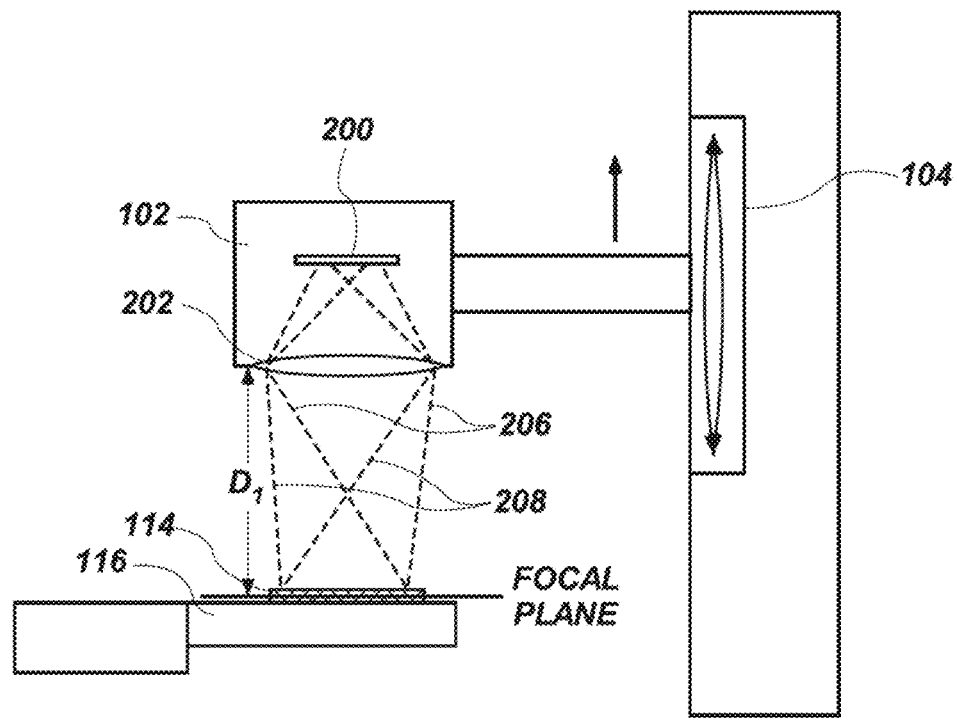
FIG. 2B shows a diagram of the optical paths of two beam pairs when the microscope of FIG. 1 is in focus, in accordance with some embodiments.
Figure 3:
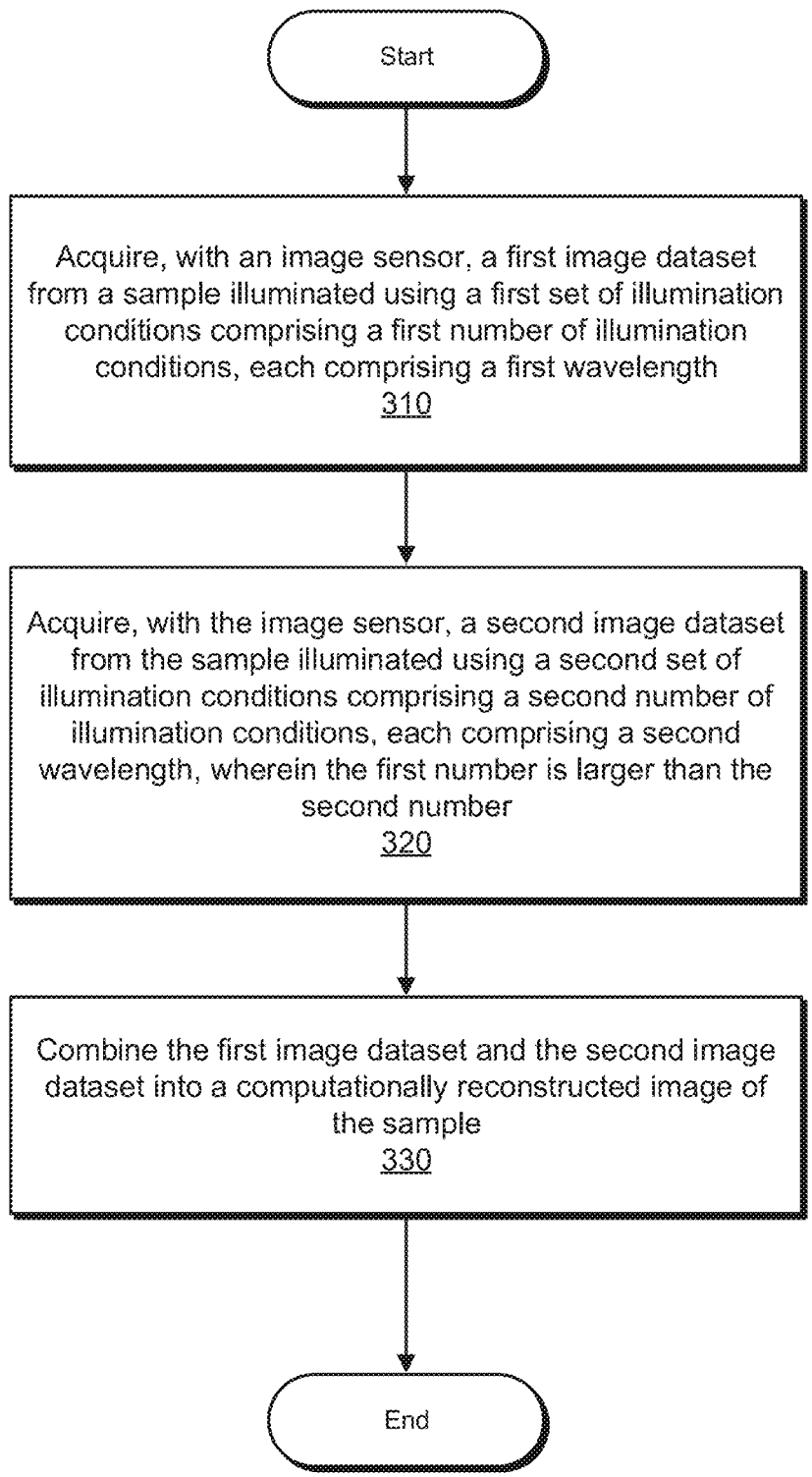
FIG. 3 shows a flowchart for an exemplary process for compressed acquisition of microscopic images, in accordance with some embodiments.
Figure 4:
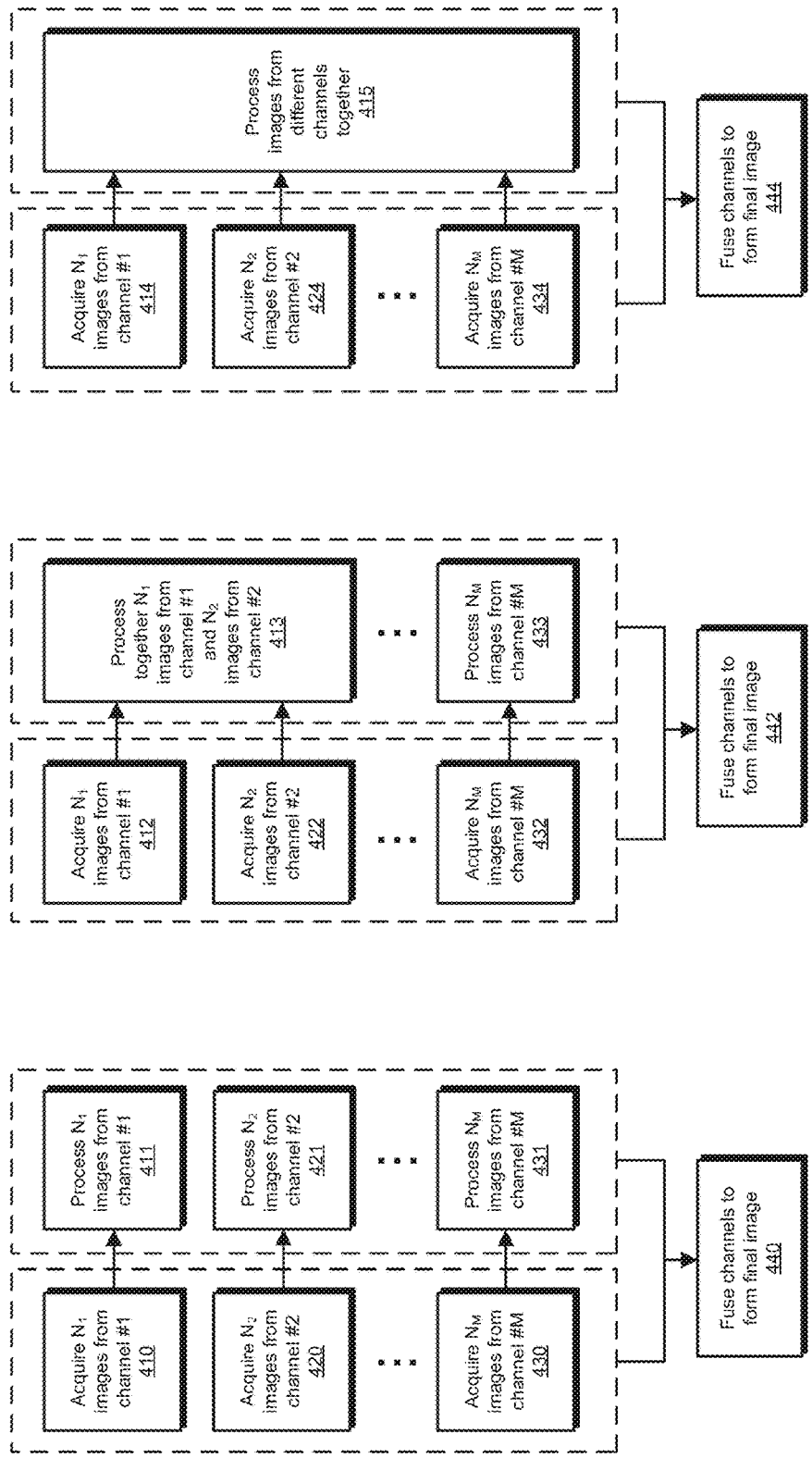
FIGS. 4A-C show several workflow diagrams for exemplary processes for compressed acquisition of microscopic images, in accordance with some embodiments.
Figure 5:
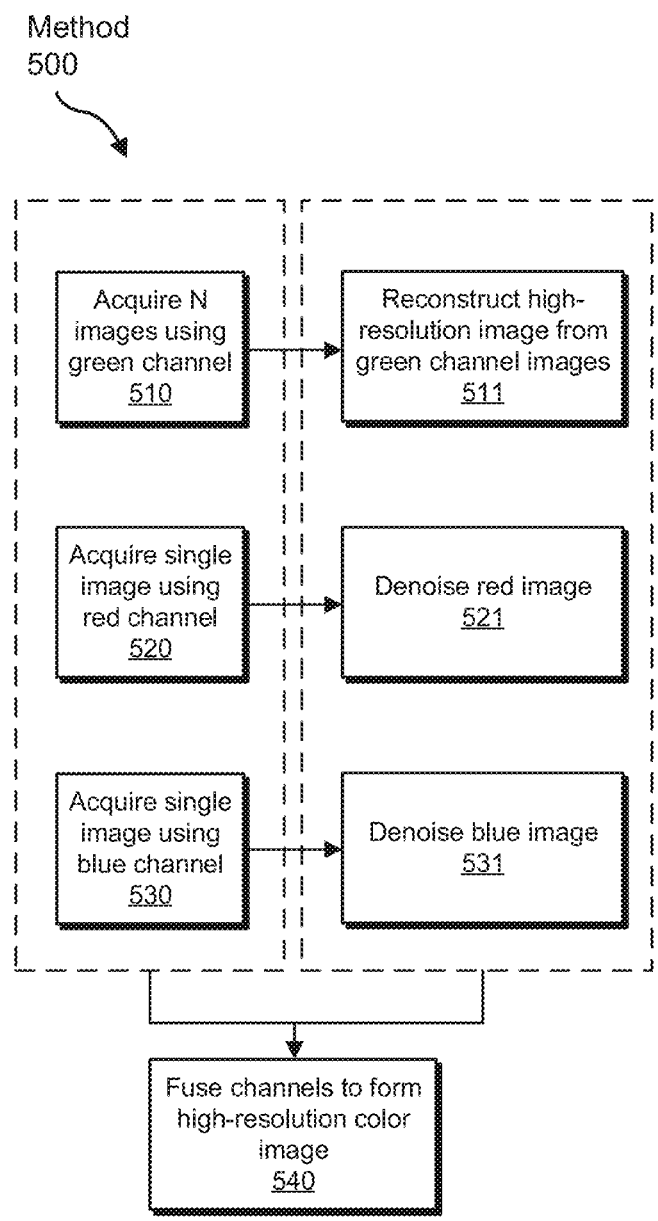
FIG. 5 shows a workflow diagram for an exemplary process for compressed acquisition of microscopic images, in accordance with some embodiments.

The following will provide, with reference to FIGS. 1-9, detailed descriptions of adaptive sensing. FIGS. 1 and 2 illustrate a microscope and various microscope configurations. FIGS. 3-5 illustrate exemplary processes for compressed acquisition of microscopic images of a sample. FIGS. 6-9 illustrate exemplary images of a sample at different wavelengths.

FIG. 1 is a diagrammatic representation of a microscope 100 consistent with the exemplary disclosed embodiments. The term "microscope" as used herein generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that comprises an image sensor and image-processing algorithms to enhance or magnify the object's size or other properties. The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" as used herein generally refers to a sensor or device that records the optical signals entering a lens as an image or a sequence of images. The optical signals may be in the near-infrared, infrared, visible, and ultraviolet spectrums. Examples of an image capture device comprise a CCD camera, a CMOS camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, 10 Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. The term "focus actuator" as used herein generally refers to any device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102. In some examples, focus actuator 104 may be configured to adjust a depth of sample 114 used to form an image of sample 114 on image capture device 102. For instance, focus actuator 114 may be configured to move to a first configuration to image or capture sample 114 at a first depth and to move to a second configuration to image or capture sample 114 at a second depth.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc. Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may comprise illumination assembly 110. The term "illumination assembly" as used herein generally refers to any device or system capable of projecting light to illuminate sample 114.

Illumination assembly 110 may comprise any number of light sources, such as light emitting diodes (LEDs), LED array, lasers, and lamps configured to emit light, such as a halogen lamp, an incandescent lamp, or a sodium lamp. In one embodiment, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle α1, and a beam 120 projected from a second illumination angle α2. In some embodiments, first illumination angle α1 and second illumination angle α2 may have the same value but opposite sign. In other embodiments, first illumination angle α1 may be separated from second illumination angle α2. However, both angles originate from points within the acceptance angle of the optics.

In another example, illumination assembly 110 may comprise one or more light sources configured to emit light in different wavelengths. In this case, the different illumination conditions may comprise different wavelengths. The different wavelengths may include one or more of a violet wavelength within a range from about 380 to about 450 nanometers (nm), a blue wavelength within a range from about 450 to about 485 nm, a cyan wavelength within a range from about 485 to 500 nm, a green wavelength within a range from about 500 to 565 nm, a yellow wavelength within a range from about 565 to about 590 nm, an orange wavelength within a range from about 590 to 625 nm, a red wavelength within a range from about 625 to about 740 nm, an infrared wavelength greater than 700 nm, or a near infrared wavelength within a range from about 700 nm to about 1100 nm.

In yet another example, illumination assembly 110 may configured to use a number of light sources at predetermined times. In this case, the different illumination conditions may comprise different illumination patterns. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may comprise, be connected with, or in communication with (e.g., over a network or wirelessly, e.g., via Bluetooth) user interface 112. The term "user interface" as used herein generally refers to any device suitable for presenting a magnified image of sample 114 or any device suitable for receiving inputs from one or more users of microscope 100.

FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

FIGS. 2A and 2B depict a closer view of microscope 100 in two cases. Specifically, FIG. 2A illustrates the optical paths of two beams pairs when microscope 100 is out of focus, and FIG. 2B illustrates the optical paths of two beams pairs when microscope 100 is in focus. In cases where the sample is thicker than the depth of focus or the change in depth is rapid, some portions of the sample may be in focus, while other portions may not be in focus.

As shown in FIGS. 2A and 2B, image capture device 102 comprises an image sensor 200 and a lens 202. In microscopy, lens 202 may be referred to as an objective lens of microscope 100. The term "image sensor" as used herein generally refers to a device capable of detecting and converting optical signals into electrical signals. The electrical signals may be used to form an image or a video stream based on the detected signals. Examples of image sensor 200 may comprise semiconductor charge-coupled devices (CCD), active pixel sensors in complementary metal-oxide-semiconductor (CMOS), or N-type metal-oxide-semiconductor (NMOS, Live MOS). The term "lens" as used herein refers to a ground or molded piece of glass, plastic, or other transparent material with opposite surfaces either or both of which are curved, by means of which light rays are refracted so that they converge or diverge to form an image. The term "lens" may also refer to an element containing one or more lenses as defined above, such as in a microscope objective. The lens is positioned at least generally transversely of the optical axis of image sensor 200. Lens 202 may be used for concentrating light beams from sample 114 and directing them towards image sensor 200. In some embodiments, image capture device 102 may comprise a fixed lens or a zoom lens.

When sample 114 is located at a focal-plane 204, the image projected from lens 202 is completely focused. The term "focal-plane" is used herein to describe a plane that is perpendicular to the optical axis of lens 202 and passes through the lens's focal point. The distance between focal-plane 204 and the center of lens 202 is called the focal length and is represented by D1. In some cases, sample 114 may not be completely flat, and there may be small differences between focal-plane 204 and various regions of sample 114. Accordingly, the distance between focal-plane 204 and sample 114 or a region of interest (ROI) of sample 114 is marked as D2. The distance D2 corresponds with the degree in which an image of sample 114 or an image of ROI of sample 114 is out of focus. For example, distance D2 may be between 0 and about 3 mm. In some embodiments, D2 may be greater than 3 mm. When distance D2 equals to zero, the image of sample 114 (or the image of ROI of sample 114) is completely focused. In contrast, when D2 has a value other than zero, the image of sample 114 (or the image of ROI of sample 114) is out of focus.

FIG. 2A depicts a case where the image of sample 114 is out of focus. For example, the image of sample 114 may be out of focus when the beams of light received from sample 114 do not converge on image sensor 200. FIG. 2A depicts a beams pair 206 and a beams pair 208. Neither pair converges on image sensor 200. For the sake of simplicity, the optical paths below sample 114 are not shown. Consistent with the present disclosure, beams pair 206 may correspond with beam 120 projected from illumination assembly 110 at illumination angle α2, and beams pair 208 may correspond with beam 118 projected from illumination assembly 110 at illumination angle α1. In addition, beams pair 206 may concurrently hit image sensor 200 with beams pair 208. The term "concurrently" in this context means that image sensor 200 has recorded information associated with two or more beams pairs during coincident or overlapping time periods, either where one begins and ends during the duration of the other, or where a later one starts before the completion of the other. In other embodiments, beams pair 206 and beams pair 208 may sequentially contact image sensor 200. The term "sequentially" means that image sensor 200 has started recording information associated with, for example, beam pair 206 after the completion of recording information associated with, for example, beam pair 208.

As discussed above, D2 is the distance between focal-plane 204 and sample 114, and it corresponds with the degree in which sample 114 is out of focus. In one example, D2 may have a value of 50 micrometers. Focus actuator 104 is configured to change distance D2 by converting input signals from controller 106 into physical motion. In some embodiments, in order to focus the image of sample 114, focus actuator 104 may move image capture device 102. In this example, to focus the image of sample 114 focus actuator 104 may move image capture device 102 50 micrometers up. In other embodiments, in order to focus the image of sample 114, focus actuator 104 may move stage 116 down. Therefore, in this example, instead of moving image capture device 102 50 micrometers up, focus actuator 104 may move stage 116 50 micrometers down.

FIG. 2B illustrates a case where the image of sample 114 is in focus. In this case, both beam pairs 206 and 208 converge on image sensor 200, and distance D2 equals to zero. In other words, focusing the image of sample 114 (or the image of ROI of sample 114) may rely on adjusting the relative distance between image capture device 102 and sample 114. The relative distance may be represented by D1-D2, and when distance D2 equals to zero, the relative distance between image capture device 102 and sample 114 equals to distance D1, which means that the image of sample 114 is focused.

FIG. 3 illustrates an exemplary method 300 for compressed acquisition of microscopic images of a sample, such as sample 114, using a suitable microscope, such as microscope 100. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may acquire, with an image sensor, a first image dataset from a sample illuminated using a first set of illumination conditions comprising a first number of illumination conditions, each comprising a first wavelength. For example, microscope 100 may acquire, with image capture device 102, a first image dataset from sample 114 illuminated by illumination assembly 110 using a first set of illumination conditions having a first number of illumination conditions. The first image dataset may include a plurality of images of sample 114.

The first set of illumination conditions may each include the first wavelength such that illumination assembly 110 may illuminate sample 114 by emitting light at the first wavelength. The first wavelength may correspond to a first color. For example, the first wavelength may correspond to one of the following ranges: an ultraviolet range from about 200 to about 380 nanometers (nm), a violet range from about 380 to about 450 nm, a blue range from about 450 to about 485 nm, a cyan range from about 485 to 500 nm, a green range from about 500 to 565 nm, a yellow range from about 565 to about 590 nm, an orange range from about 590 to 625 nm, a red range from about 625 to about 740 nm, or a near infrared range from about 700 nm to about 1100 nm. In some examples, the first wavelength may correspond to a first peak of a first illumination source emitting a first distribution of wavelengths. The first distribution of wavelengths may include a first full width half maximum.

In some implementations, method 300 may include determining the first wavelength. The first wavelength may be user-defined, such as defined and/or associated with each sample. Alternatively, determining the first wavelength may be dynamic and/or adaptive for each wavelength to be captured by microscope 100. Determining the first wavelength may include acquiring, with image capture device 102, an initial image dataset of sample 114 illuminated with a plurality of wavelengths, for instance by illumination assembly 110. Controller 106, as part of microscope 100 may determine that a first image of the initial image dataset includes more information than a second image of the initial dataset. Microscope 100 may select, as the first wavelength, the wavelength corresponding to the first image. For example, microscope 100 may capture a first image of sample 114 illuminated under a green wavelength, a second image of sample 114 illuminated under a red wavelength, and a third image of sample 114 illuminated under a blue wavelength. Microscope 100 may select, as the first wavelength, the wavelength corresponding to the image having the most information, which may correspond to spatial frequency information. For instance, if the green channel image contains more information than the red channel image and the blue channel image, microscope 100 may select green as the first wavelength. Microscope 100 may also prioritize or otherwise rank the other wavelengths. For example, microscope 100 may select red as a second wavelength, and blue as a third wavelength.

In some examples, microscope 100 may determine the first set of illumination conditions. Microscope 100 may determine the first set of illumination conditions based on information identified from the initial image dataset. Microscope 100 may determine, for example, a number of light sources, a location of light sources, a combination of locations of a plurality of light sources, an illumination angle, a combination of illumination angles, a number of illuminations, a position of a diffuser, a pattern of light, a filter, a mask, or a focus of the sample.

In some examples, microscope 100 may determine a computational process for reconstructing the first image. For example, microscope 100 may determine the computational process based on the initial image dataset, such as by recognizing certain information and/or patterns from the initial image dataset.

At step 320 one or more of the systems described herein may acquire, with the image sensor, a second image dataset from the sample illuminated using a second set of illumination conditions comprising a second number of illumination conditions, each comprising a second wavelength. The first number of illumination conditions may be larger than the second number of illumination conditions. For example, microscope 100 may acquire, with image capture device 102, a second image dataset from sample 114 illuminated by illumination assembly 110 using a second set of illumination conditions having a second number of illumination conditions that is less than the first number of illumination conditions. The second image dataset may include one or more images of sample 114.

The first number may be larger than the second number by at least a factor of two. A second acquisition time associated with the second image dataset may be no more than half of a first acquisition time associated with the first image dataset.

In addition to having fewer illumination conditions, the second set of illumination conditions may further differ from the first set of illumination conditions. The second image dataset may be smaller than the first image dataset. For instance, because there are fewer illumination conditions, microscope 100 may capture fewer images for the second image dataset than the first image dataset. In some implementations, microscope 100 may acquire the second image dataset after acquiring the first image dataset.

The second set of illumination conditions may each include the second wavelength such that illumination assembly 110 may illuminate sample 114 by emitting light at the second wavelength. The second wavelength may correspond to a second color. For example, the second wavelength may correspond to one of the following ranges: an ultraviolet range from about 200 to about 380 nanometers (nm), a violet range from about 380 to about 450 nm, a blue range from about 450 to about 485 nm, a cyan range from about 485 to 500 nm, a green range from about 500 to 565 nm, a yellow range from about 565 to about 590 nm, an orange range from about 590 to 625 nm, a red range from about 625 to about 740 nm, or a near infrared range from about 700 nm to about 1100 nm.

The second wavelength may differ from the first wavelength. For instance, the second wavelength may correspond to a second color that is different from the first color (of the first wavelength). In some examples, the first wavelength may correspond to a first peak of a first illumination source emitting a first distribution of wavelengths (which may include a first full width half maximum) and the second wavelength may correspond to a second peak of a second distribution of wavelengths (which may include a second full width half maximum). The first full width half maximum may not overlap with the second full width half maximum. Alternatively, the first and second wavelengths may correspond to different ranges of wavelengths.

In some examples, the second wavelength may be determined. For example, the second wavelength may be user-defined. Alternatively, microscope 100 may determine the second wavelength, as described above with respect to step 310. In addition, microscope 100 may determine the second set of illumination conditions, for instance based on the initial image dataset described above with respect to step 310.

At step 330 one or more of the systems described herein may combine the first image dataset and the second image dataset into a computationally reconstructed image of the sample. For example, microscope 100 may combine the first image dataset and the second image dataset into a computationally reconstructed image of sample 114.

The computationally reconstructed image may include one or more of a two-dimensional (2D) image, a three-dimensional (3D) image, a 2D intensity image, a 3D intensity image, a 2D phase image, a 3D phase image, a 2D fluorescence image, a 3D fluorescence image a 2D hyperspectral image, or a 3D hyperspectral image. The computationally reconstructed image may include a color image. For instance, the color image may include two or more of a red channel, a green channel, or a blue channel. In such examples, the first wavelength may correspond to one of the red channel, the green channel, or the blue channel, and the second wavelength may correspond to another one of the red channel, the green channel, or the blue channel.

Moreover, a spatial frequency bandwidth of the computationally reconstructed image may be greater than a spatial frequency bandwidth of each of a plurality of images acquired with the first set of illumination conditions by at least a factor of 1.5.

In some examples, microscope 100 may process the first image dataset and the second image dataset separately to generate a first computationally reconstructed image from the first image dataset and to generate a second computationally reconstructed image from the second dataset. Microscope 100 may combine the first computationally reconstructed image with the second computationally reconstructed image to generate the computationally reconstructed image. The first image dataset may include a first plurality of images and the second image dataset may include one or more images. The one or more images may include a single image acquired with the second set of illumination conditions. Alternatively, the one or more images may include a second plurality of images. Microscope 100 may process the first plurality of images and the one or more images together to generate the computationally reconstructed image.

Moreover, in some examples, microscope 100 may acquire, with the image sensor (e.g., image capture device 102), a third image dataset from the sample illuminated with a third wavelength using a third set of illumination conditions. The third set of illumination conditions may include a third number of illumination conditions less than the first number of illumination conditions. Microscope 100 may combine the third dataset with the first image dataset and the second image dataset to generate the computationally reconstructed image.

In another example, microscope 100 may acquire, with the image sensor (e.g., image capture device 102), N additional image datasets from the sample illuminated with N additional wavelengths using N additional sets of illumination conditions. N may be an integer of at least one. For example, N may be an integer within a range from about 10 to about 100. Microscope 100 may combine the N additional datasets with the first image dataset, the second image dataset, and the third image data to generate the computationally reconstructed image. The computationally reconstructed image may include a hyperspectral image.

FIG. 4A illustrates a workflow diagram of a corresponding method 400, which may be performed by a suitable microscope, such as microscope 100. Method 400 may correspond to a variation of method 300.

As illustrated in FIG. 4A, at step 410 (which may correspond to step 310), microscope 100 may acquire, using image capture device 102, $N_1$ images from channel #1, as illuminated by illumination assembly 110. At step 411 (which may correspond to step 330), microscope 100 may process the $N_1$ images from channel #1, for example to generate a first computationally reconstructed image for channel #1. Microscope 100 may determine a resolution for the first computationally reconstructed image based on the number of low-resolution images (e.g., $N_1$).

At step 420 (which may correspond to step 320), microscope 100 may acquire, using image capture device 101, $N_2$ images from channel #2, as illuminated by illumination assembly 110. At step 421 (which may correspond to step 330), microscope 100 may process the $N_2$ images from channel #2, for example to generate a second computationally reconstructed image for channel #2. Microscope 100 may determine a resolution for the second computationally reconstructed image based on the number of low-resolution images (e.g., $N_2$).

Microscope 100 may repeat the acquisition and processing for each channel, e.g. channel #1 to channel #M, in any order. In addition, as described herein, microscope 100 may adaptively determine the illumination conditions, including a number of illuminations, for each channel and for each sample. At step 430 (which may correspond to step 320), microscope 100 may acquire, using image capture device 101, NM images from channel #M. At step 431 (which may correspond to step 330), microscope 100 may process the $N_M$ images from channel #M, for example to generate a computationally reconstructed image for channel #M.

At step 440 (which may correspond to step 330), microscope 100 may fuse the channels (e.g., channels #1-M), to form a final image. For example, microscope 100 may generate the final computationally reconstructed image for sample 114 using the acquired images for each channel, the computationally reconstructed images for each channel, and/or any subcombination thereof. The fusing of the channels can be performed in many ways. In some embodiments one or more of steps 540, 440, 442, or 444 includes color calibration and may use a color space such as CIELAB, CIELUV, YCbCr, XYZ, or CIEUVW, for example.

FIG. 4B illustrates a workflow diagram of another method 402, which may be performed by a suitable microscope, such as microscope 100. Method 402 may correspond to a variation of method 300 and/or method 400.

As illustrated in FIG. 4B, at step 412 (which may correspond to step 310), microscope 100 may acquire, using image capture device 102, $N_1$ images from channel #1, as illuminated by illumination assembly 110. At step 422 (which may correspond to step 320), microscope 100 may acquire, using image capture device 101, $N_2$ images from channel #2, as illuminated by illumination assembly 110.

At step 413 (which may correspond to step 330), microscope 100 may process the $N_1$ images from channel #1 and the $N_2$ images from channel #2, for example to generate a computationally reconstructed image for channel #1 and channel #2.

Microscope 100 may repeat the acquisition and processing for each channel, e.g. channel #1 to channel #M, in any order. At step 432 (which may correspond to step 320), microscope 100 may acquire, using image capture device 101, $N_M$ images from channel #M. At step 433 (which may correspond to step 330), microscope 100 may process the NM images from channel #M, for example to generate a computationally reconstructed image for channel #M.

At step 442 (which may correspond to step 330), microscope 100 may fuse the channels (e.g., channels #1-M), to form a final image. For example, microscope 100 may generate the final computationally reconstructed image for sample 114 using the acquired images for each channel, the computationally reconstructed images for each channel and/or channel combination, and/or any subcombination thereof.

FIG. 4C illustrates a workflow diagram of another method 404, which may be performed by a suitable microscope, such as microscope 100. Method 404 may correspond to a variation of method 300, method 400, and/or method 402.

Microscope 100 may acquire images and process each channel, e.g. channel #1 to channel #M, in any order. As illustrated in FIG. 4C, at step 414 (which may correspond to step 310), microscope 100 may acquire, using image capture device 102, $N_1$ images from channel #1, as illuminated by illumination assembly 110. At step 424 (which may correspond to step 320), microscope 100 may acquire, using image capture device 101, $N_2$ images from channel #2, as illuminated by illumination assembly 110. At step 432 (which may correspond to step 320), microscope 100 may acquire, using image capture device 101, $N_M$ images from channel #M.

At step 415 (which may correspond to step 330), microscope 100 may process the $N_1$ images from channel #1, the $N_2$ images from channel #2, and the $N_M$ images from channel #M for example to generate a computationally reconstructed image for channel #1 through channel #M.

At step 444 (which may correspond to step 330), microscope 100 may fuse the channels (e.g., channels #1-M), to form a final image. For example, microscope 100 may generate the final computationally reconstructed image for sample 114 using the acquired images for each channel, the computationally reconstructed images for the channel combination, and/or any subcombination thereof.

FIG. 5 illustrates a workflow diagram of a method 500, which may be performed by a suitable microscope, such as microscope 100. Method 500 may correspond to a variation of method 300, method 400, method 402, and/or method 404. In particular, method 500 may correspond to a specific example of method 400.

Figure 6:
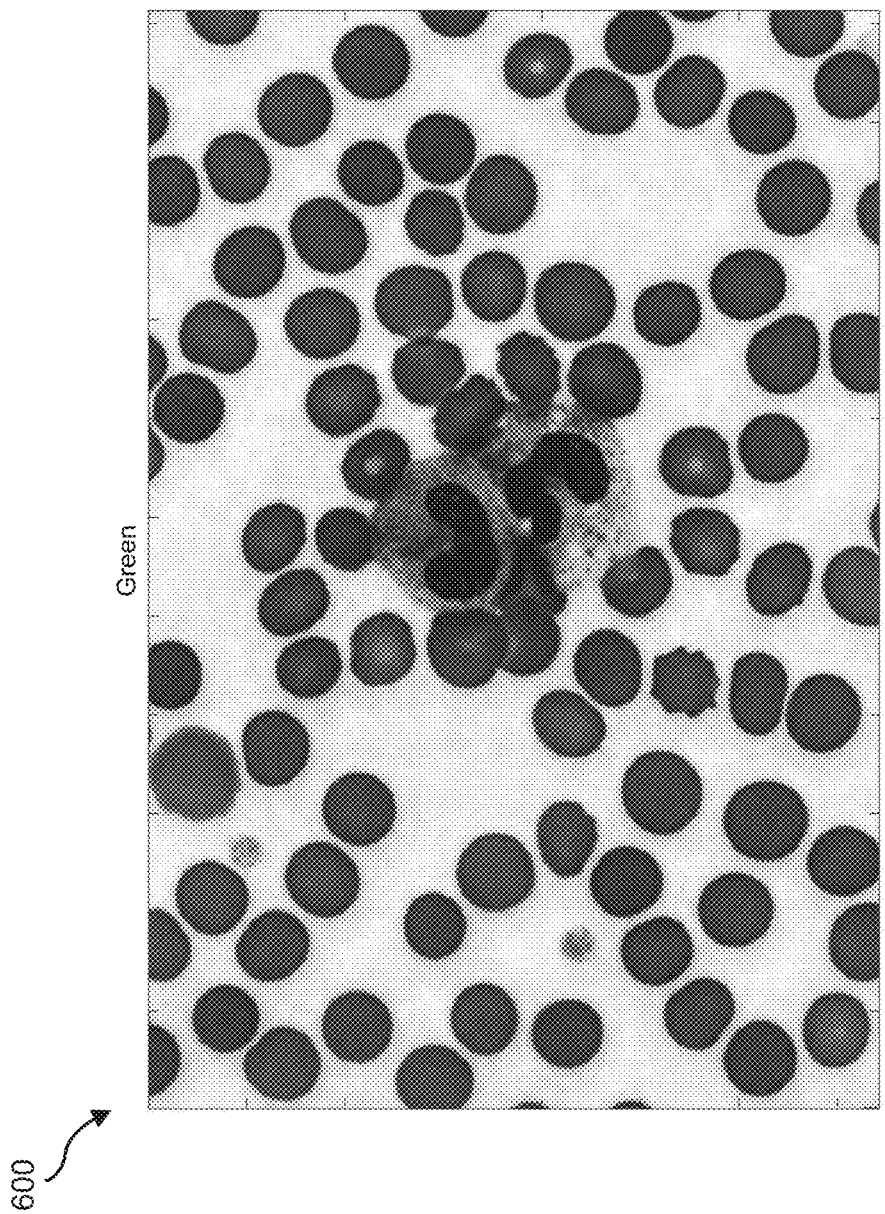
FIG. 6 shows a high-resolution reconstruction of a sample from multiple low-resolution images in a first channel, in accordance with some embodiments.

As illustrated in FIG. 5, at step 510 (which may correspond to step 310 and/or step 410), microscope 100 may acquire, using image capture device 102, N images using a green channel, as illuminated by illumination assembly 110. As described above, the green channel may provide more information than the red or blue channels, such that it may be desirable to prioritize the green channel. Microscope 100 may determine N adaptively, as described herein, or may use a pre-configured value. In addition, microscope 100 may acquire the N images from the green channel at a low resolution, such as a resolution lower than a native resolution of microscope 100. At step 511 (which may correspond to step 330 and/or step 411), microscope 100 may process the N images from the green channel, for example to reconstruct a high-resolution image from the green channel images, which may be low-resolution images. FIG. 6 shows a high-resolution image 600 which may be reconstructed from the N images from the green channel.

Figure 7:
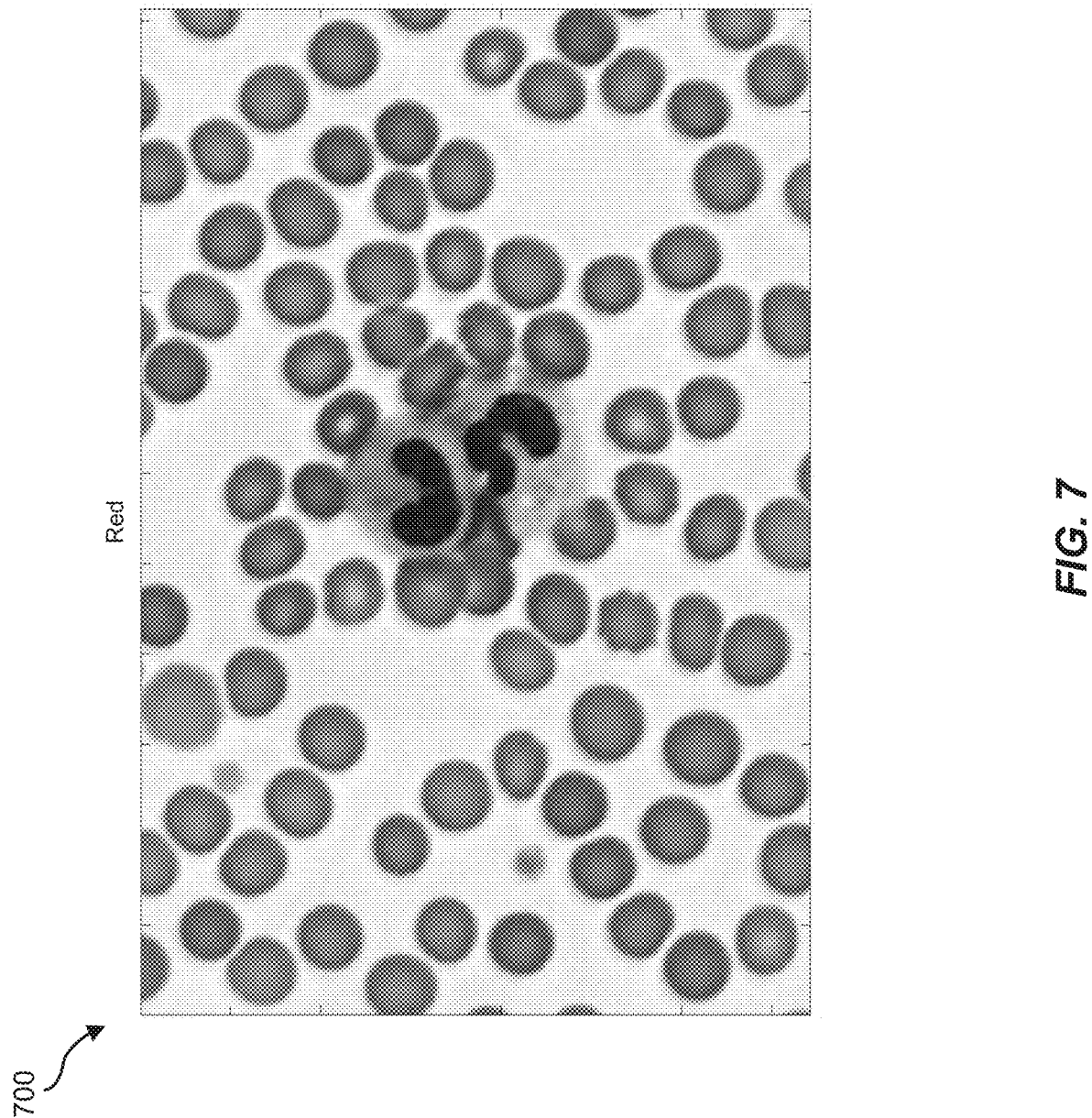
FIG. 7 shows a single image of the sample of FIG. 6 acquired in a second channel, in accordance with some embodiments.

At step 520 (which may correspond to step 320 and/or step 420), microscope 100 may acquire, using image capture device 101, a single image from the red channel, as illuminated by illumination assembly 110. Microscope 100 may acquire the red channel image at a native resolution of microscope 100. At step 521 (which may correspond to step 330 and/or step 421), microscope 100 may process the image from the red channel, for example to denoise or otherwise enhance the red image. FIG. 7 shows an image 700 which may be a single image acquired using a Kohler illumination. As seen in FIGS. 6 and 7, image 700 may have a lower resolution than that of image 600.

Figure 8:
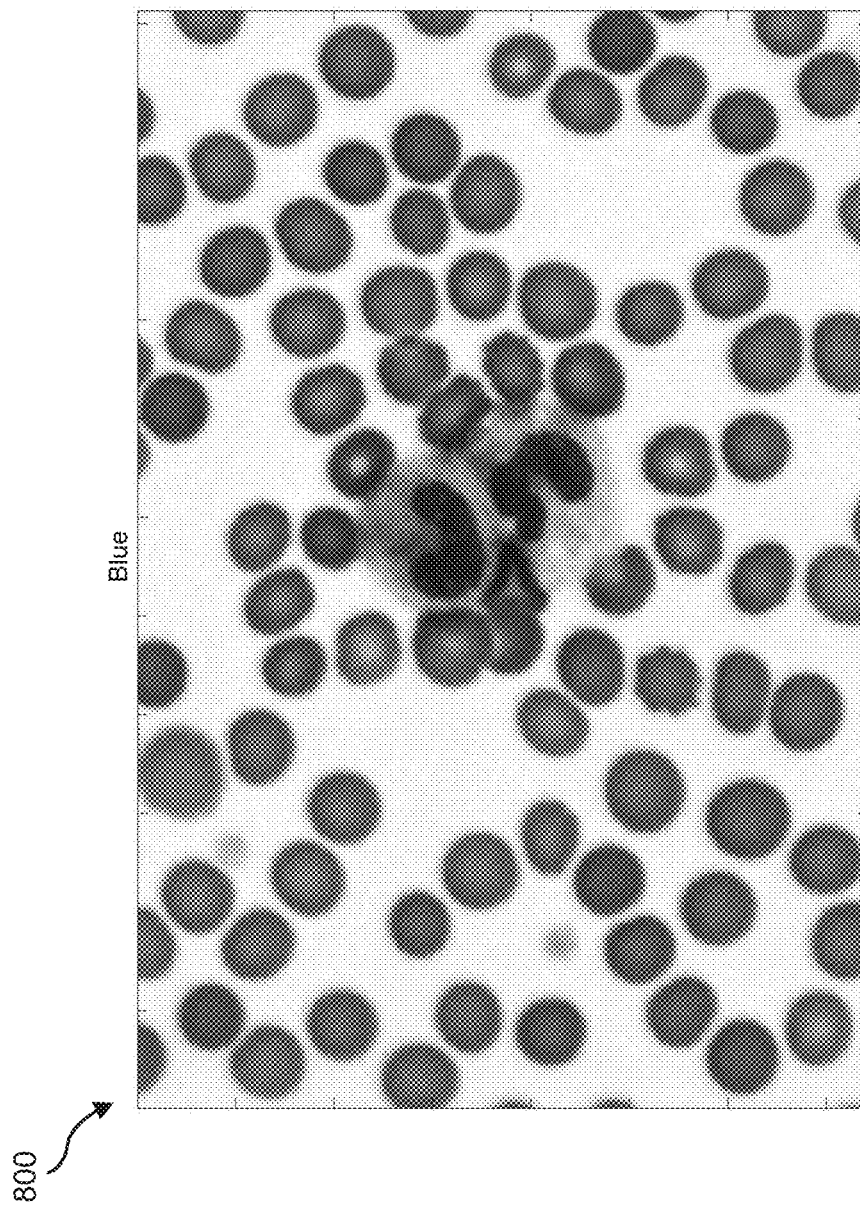
FIG. 8 shows a single image of the sample of FIG. 6 acquired in a third channel, in accordance with some embodiments.

At step 530 (which may correspond to step 320 and/or step 430), microscope 100 may acquire, using image capture device 101, a single image from the blue channel. Microscope 100 may acquire the blue channel image at a native resolution of microscope 100. At step 531 (which may correspond to step 330 and/or step 431), microscope 100 may process the image from the blue channel, for example to denoise the blue image. FIG. 8 shows an image 800 which may be a single image acquired using a Kohler illumination. As seen in FIGS. 6 and 8, image 800 may have a lower resolution than that of image 600.

Figure 9:
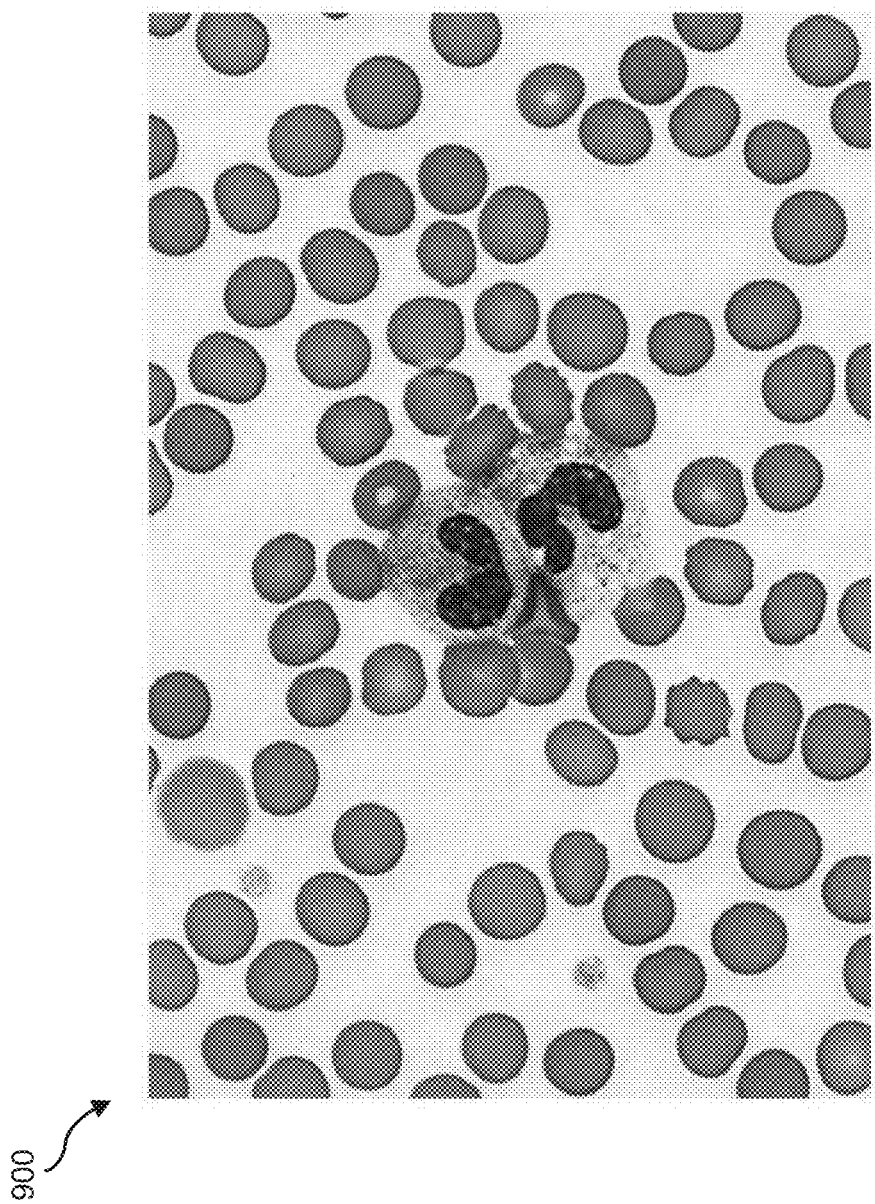
FIG. 9 shows a color high-resolution image generated by processing together the images of FIGS. 6, 7, and 8, in accordance with some embodiments

At step 540 (which may correspond to step 330 and/or step 440), microscope 100 may fuse the channels (e.g., the red, green, and blue channels), to form a high-resolution color image. For example, microscope 100 may generate the final computationally reconstructed image for sample 114 using the acquired images for each channel, the processed images for each channel, and/or any subcombination thereof. FIG. 9 shows an image 900 which may be a color, high-resolution image generated by processing image 600, image 700, and image 800 together. As seen in FIGS. 6-9, image 900 may have a higher resolution than that of image 600, image 700, and image 800. Although FIG. 5 shows the acquisition and processing in order of green, red, and blue, microscope 100 may perform the acquisition and processing for each channel in any order.

The improved spatial frequency bandwidth of the computationally reconstructed image will be appreciated with reference to exemplary images shown in FIGS. 10 to 13, in accordance with some embodiments.

Figure 10:
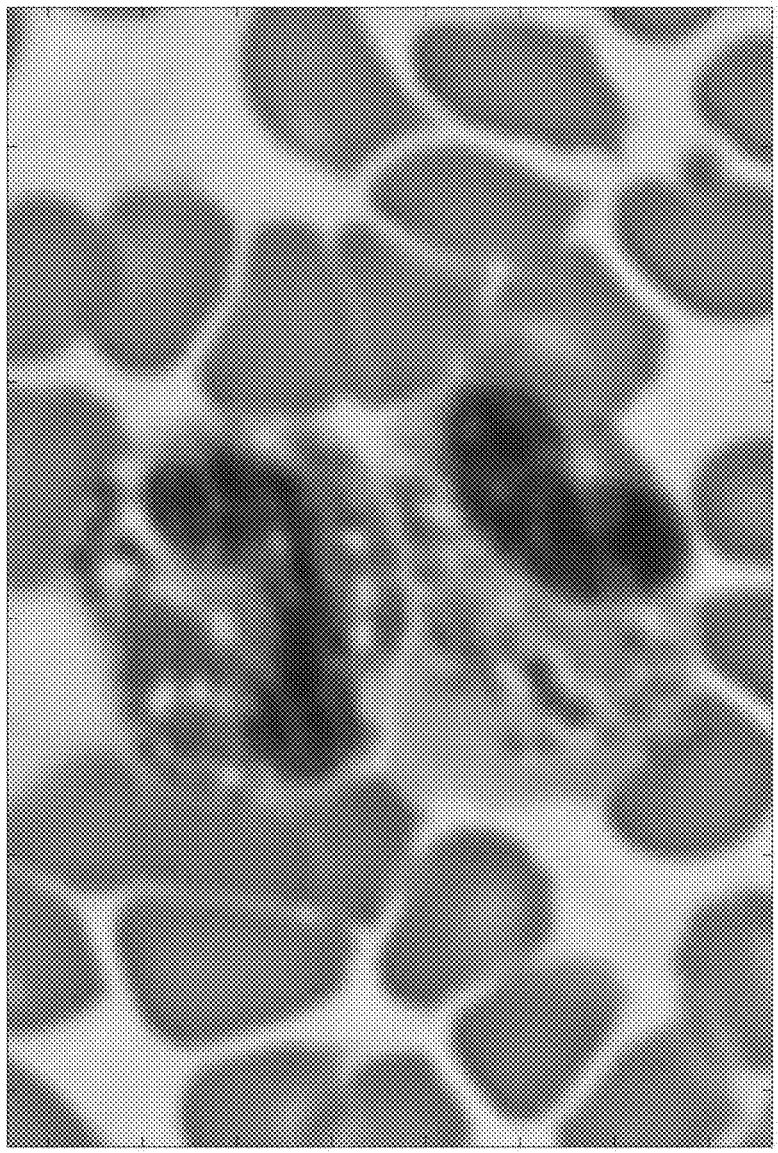
FIG. 10 shows a zoomed in raw image acquired with an image sensor using a red illumination color and corresponding cellular structure.
Figure 11:
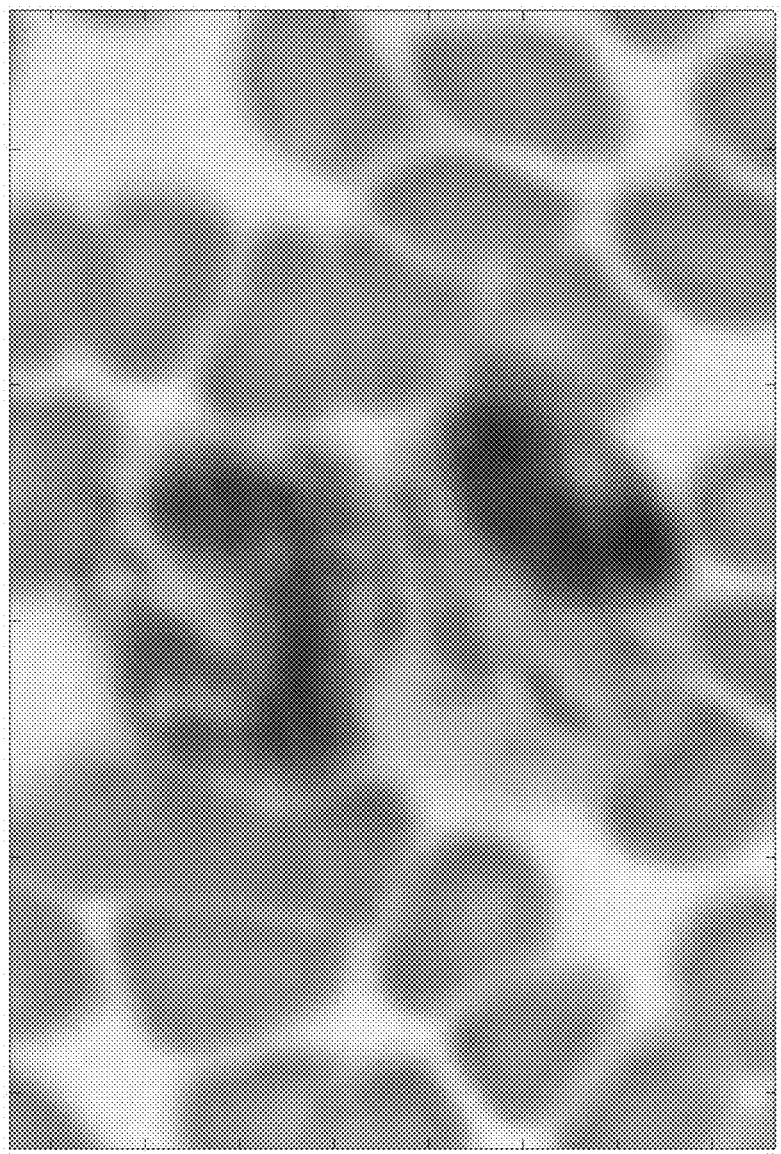
FIG. 11 shows a zoomed in raw image acquired with the image sensor using a blue illumination color and the corresponding cellular structure of FIG. 10.
Figure 12:
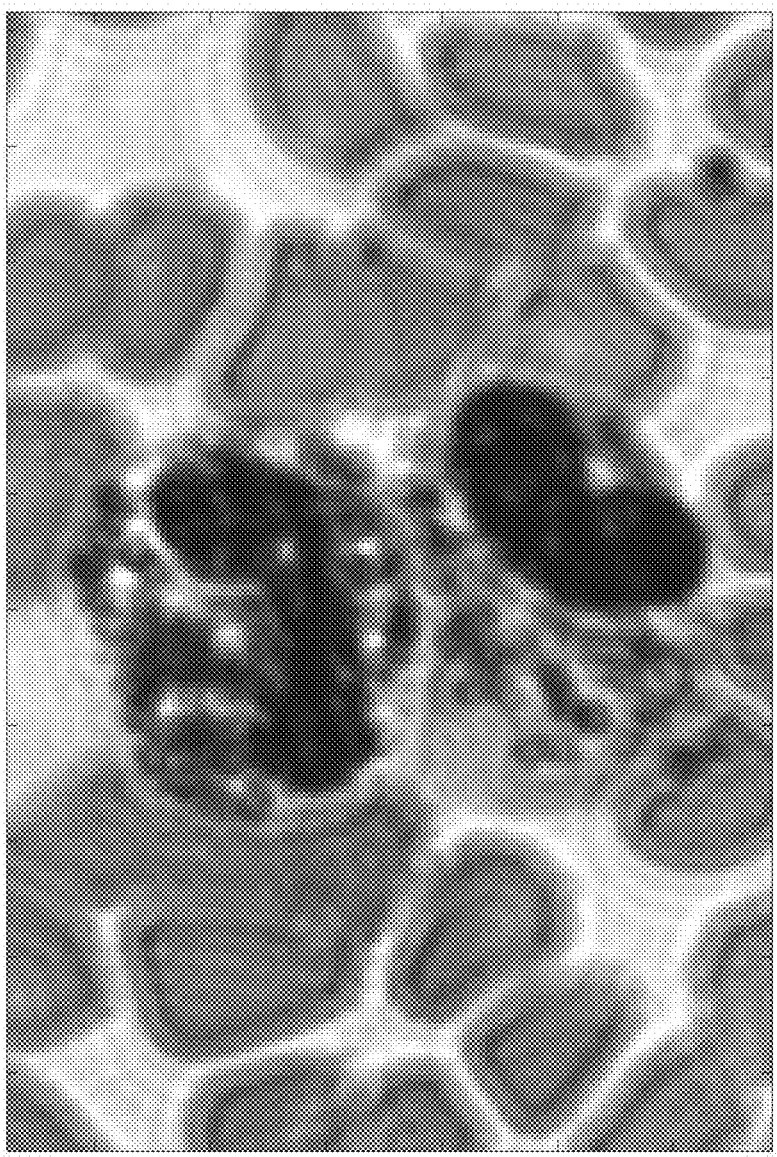
FIG. 12 shows a zoomed in raw image acquired with the image sensor using a green illumination color and the corresponding cellular structure of FIG. 10.
Figure 13:
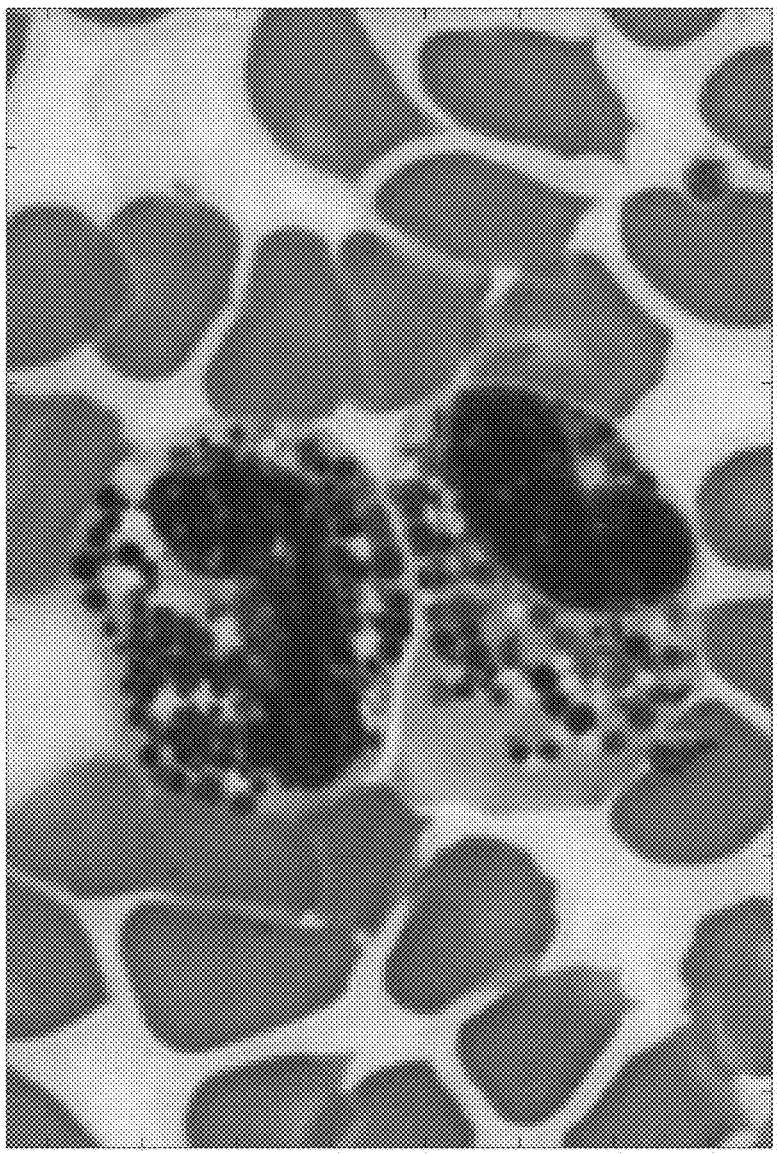
FIG. 13 shows a computationally reconstructed image obtained from a plurality of images illuminated with a green color and the corresponding cellular structure of FIGS. 10 to 12.

FIG. 10 shows a zoomed in raw image 1000 acquired with an image sensor using a red illumination color and corresponding cellular structure;

FIG. 11 shows a zoomed in raw image 1100 acquired with the image sensor using a blue illumination color and the corresponding cellular structure of FIG. 10;

FIG. 12 shows a zoomed in raw image 1200 acquired with the image sensor using a green illumination color and the corresponding cellular structure of FIG. 10;

FIG. 13 shows a computationally reconstructed image 1300 obtained from a plurality of images illuminated with a green color and the corresponding cellular structure of FIGS. 10 to 12. The plurality of images was generated with a first set of illumination conditions as described herein, and the computationally reconstructed image 1300 obtained from the plurality of images as described herein.

Figure 14:
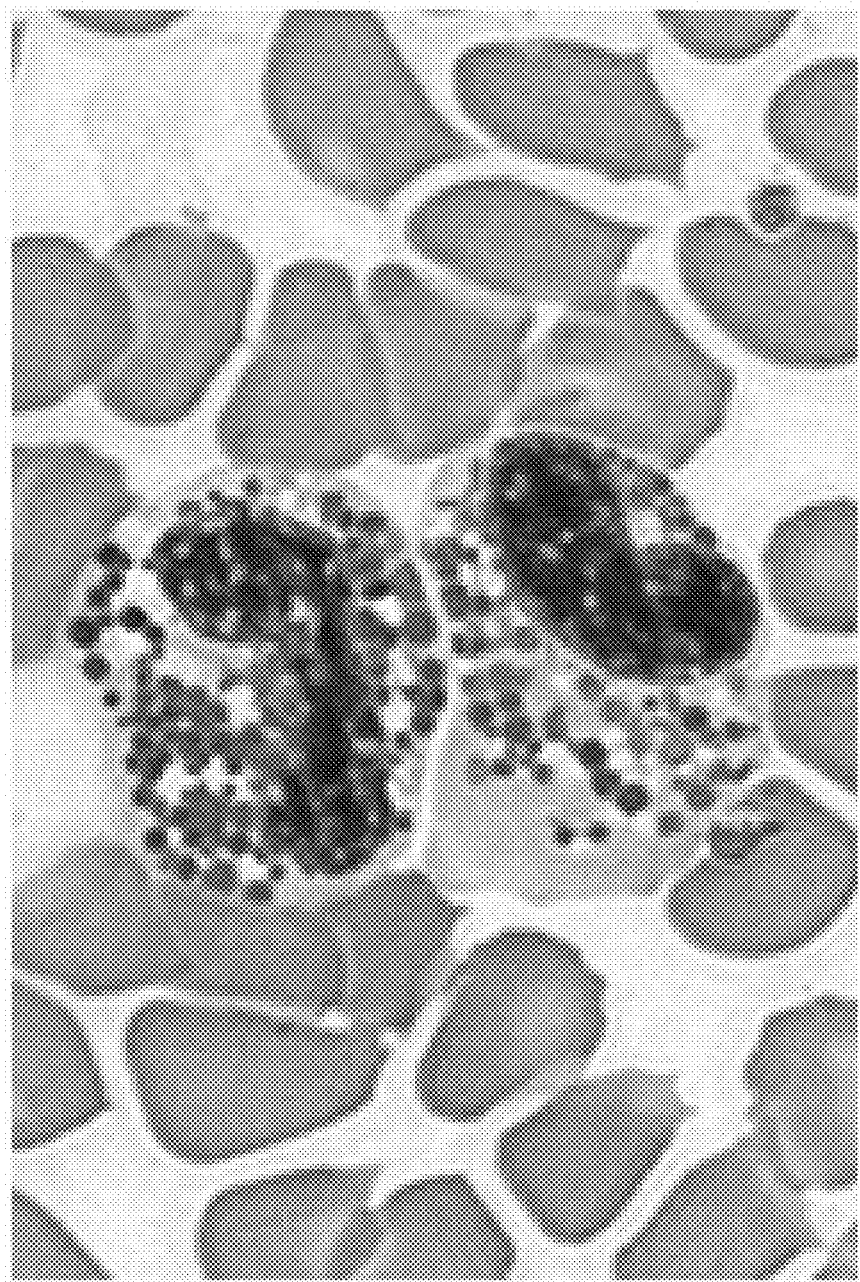
FIG. 14 shows a zoomed in computationally reconstructed color image from images as in FIGS. 10 to 12, and the corresponding cellular structure.

FIG. 14 shows a computationally reconstructed RGB image 1400 and the corresponding cellular structure of the images in FIGS. 10 to 13. The computationally reconstructed color image 1400 was generated with a plurality of green illumination conditions and a single red illumination condition and a single blue illumination condition. As will be appreciated with reference to FIGS. 10 to 14, the computationally reconstructed color image 1400 shows improved resolution of the cellular structure, as compared to the individual red, blue and green images of FIGS. 10 to 12, respectively. The computationally reconstructed color image 1400 can be obtained by combining a computationally reconstructed image corresponding to a first wavelength and a first set of illumination conditions, e.g. image 1300, with one or more images from other illumination wavelengths as described herein, e.g. image 1000 and image 1100. Alternatively, the data from the images at different wavelengths and illumination conditions can be combined to generate the computationally reconstructed color image 1400 without first generating a computationally reconstructed image corresponding to the first wavelength and the first set of illumination conditions as described herein.

The computationally reconstructed color image can be used for cellular analysis and may be shown on a display viewed by a user as described herein.

In some examples, the first number of illumination conditions is larger than the second number of illumination conditions by at least a factor of two. A second acquisition time associated with the second image dataset may be no more than half of a first acquisition time associated with the first image dataset. A spatial frequency bandwidth of the computationally reconstructed image may be greater than a spatial frequency bandwidth of each of a plurality of images acquired with the first set of illumination conditions by at least a factor of 1.5.

In some examples, the computationally reconstructed image may include one or more of an increased spatial frequency bandwidth, a correction for optical aberrations, or an increase in image contrast. Microscope 100 may transform the first image data set a spatial frequency space and mapped to spatial frequencies in the spatial frequency space based on the first set of illumination conditions to provide the increased spatial frequency bandwidth of the computationally reconstructed image as compared to a first spatial frequency bandwidth of each of a plurality of images acquired with the first set of illumination conditions. The image sensor, e.g., image capture device 102, may include a spatial frequency bandwidth and the increased spatial frequency bandwidth of the computationally reconstructed image may be greater than the spatial frequency bandwidth of the image sensor divided by a magnification of an image of the sample onto the image sensor.

In some examples, the first image data set may include a first plurality of images, each comprising a first spatial frequency bandwidth. The increased spatial frequency bandwidth of the computationally reconstructed image may be greater than the first spatial frequency bandwidth of said each of the first plurality of images. The first plurality of images may include a feature of the sample not resolved with the first spatial frequency bandwidth of said each of the first plurality of images and the computationally reconstructed image may include the feature of the sample resolved with the increased spatial frequency bandwidth of the computationally reconstructed image.

Microscope 100 may provide the correction of optical aberrations by separating aberration information from sample information, so as to decrease an effect of optical aberrations on the computationally reconstructed image. Optionally, the aberration information may include aberration spatial frequencies and phases associated with optics used to image the sample on the image sensor. Optionally, the sample information may include sample spatial frequencies and phases associated with a structure of the sample.

Microscope 100 may provide the increased image contrast of the computationally reconstructed image by computationally amplifying high spatial frequencies of the reconstructed image to better represent the sample. The computationally reconstructed image may include the increased contrast. The increased contrast may include an increased ratio of high spatial frequencies to low spatial frequencies in the computationally reconstructed image as compared to a ratio of high spatial frequencies to low spatial frequencies of each of a plurality of images of the first image dataset.

Microscope 100 may show the reconstructed image on a display, such as user interface 112. The reconstructed image may be shown on the display with a first spatial frequency bandwidth for a first color channel corresponding to the first wavelength and with a second spatial frequency bandwidth for a second color channel corresponding to the second wavelength. The first spatial frequency bandwidth may be greater than the second spatial frequency bandwidth. For example, the first wavelength may correspond to green light such that the first color channel corresponds to a green channel. The second wavelength may correspond to a red light or blue light such that the second color channel corresponds to a red channel or a blue channel. The green channel may be shown on the display with the first spatial frequency bandwidth, and the red or blue channel may be shown on the display with the second spatial frequency bandwidth.

In some examples, microscope 100 may provide the reconstructed image on a display, e.g., user interface 112, with a first spatial frequency bandwidth and a first user perceivable color corresponding to the first wavelength and a second spatial frequency bandwidth and a second user perceivable color corresponding to the second wavelength. The first spatial frequency bandwidth may be greater than a spatial frequency bandwidth of one or more images acquired by the image sensor with the second set of illumination conditions at the second wavelength.

In some examples, the computationally reconstructed image may include a first spatial frequency bandwidth corresponding to the first wavelength and a second spatial frequency bandwidth corresponding to the second wavelength. The first spatial frequency bandwidth may be greater than a spatial frequency bandwidth of one or more images acquired by the image sensor with the second set of illumination conditions at the second wavelength.

In some examples, the computationally reconstructed image may include the red channel, the green channel, and the blue channel. The second wavelength may include red light corresponding to the red channel, and the third wavelength may include blue light corresponding to the third channel. The third channel may be shown on the display with a third spatial frequency bandwidth that may be less than the first spatial frequency bandwidth.

In some examples, the image sensor, e.g., image capture device 102, may include a sensor comprising a two-dimensional array of pixels. The first color of the first image dataset may correspond to the first wavelength and a second color of the second image dataset may correspond to the second wavelength. Microscope 100 may map the computationally reconstructed image to the red channel, the green channel, and the blue channel based on the first wavelength and the second wavelength.

In some examples, the image sensor may include a grayscale image sensor comprising the two-dimensional array of pixels. In some examples, the image sensor may include a color image sensor comprising a two-dimensional array of pixels and a color filter array comprising a plurality of color filters arranged over the two-dimensional array. The first image dataset may be determined based on the first wavelength and a first absorption characteristic of the color filter at the first wavelength. The second image dataset may be determined based on the second wavelength and a second absorption characteristic at the second wavelength. Microscope 100 may combine the first image dataset and the second image dataset in accordance with a first absorption characteristic of the color filter at the first wavelength and a second absorption characteristic of the color filter at the second wavelength in order to generate the computationally reconstructed image.

In some examples, the first wavelength may be different from the second wavelength and a portion of first image dataset and a portion of the second image dataset may be acquired substantially simultaneously with one or more of the set of illumination conditions illuminating the sample when the sample is illuminated with one or more of the second set of illumination conditions.

In some examples, the first dataset and the second dataset correspond to a first depth of the sample. Microscope 100 may further adjust a focus of microscope 100 to image the sample at a plurality of depths. Microscope 100 may also repeat the steps of acquiring and combining (e.g., steps 310-330) to generate the computationally reconstructed image. The computationally reconstructed image may include a plurality of computationally reconstructed images at different depths corresponding to the plurality of depths.

As explained above in connection with example method 300, method 400, method 402, method 404, and method 500, a computational imaging system described herein may reduce acquisition times for acquiring images in different wavelengths by customizing the acquisition for each wavelength. Wavelengths which will produce more information may be prioritized (e.g., given more acquisition and/or reconstruction time) over wavelengths which will produce less information. For example, because of a human eye's sensitivity to green, the green channel may be prioritized over the red and blue channels. The overall imaging time for the computational imaging system may be reduced, without significant adverse effect to the resultant reconstructed image, by reducing the acquisition and/or reconstruction times for the lessor priority wavelengths, and otherwise maintaining the acquisition and/or reconstruction times for the prioritized wavelengths. In other words, the loss of information due to reducing the acquisition and/or reconstruction times for the lessor priority wavelengths may be mitigated by the preservation of information from the prioritized wavelengths.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses. Each clause can be combined with one or more other clauses to the extent that such a combination is consistent with the teachings disclosed herein.

Clause 1. A method for generating a computationally reconstructed image, comprising: acquiring, with an image sensor, a first image dataset from a sample illuminated using a first set of illumination conditions comprising a first number of illumination conditions, each comprising a first wavelength; acquiring, with the image sensor, a second image dataset from the sample illuminated using a second set of illumination conditions comprising a second number of illumination conditions, each comprising a second wavelength, wherein the first number is larger than the second number; and combining the first image dataset and the second image dataset into a computationally reconstructed image of the sample.

Clause 2. The method of clause 1, wherein the computationally reconstructed image comprises a first spatial frequency bandwidth corresponding to the first wavelength and a second spatial frequency bandwidth corresponding to the second wavelength, the first spatial frequency bandwidth greater than the second spatial frequency bandwidth.

Clause 3. The method of clause 2, wherein the first spatial frequency bandwidth is greater than a spatial frequency bandwidth of one or more images acquired by the image sensor with the first set of illumination conditions at the first wavelength.

Clause 4. The method of clause 2, wherein the second spatial frequency bandwidth is greater than a spatial frequency bandwidth of one or more images acquired by the image sensor with the second set of illumination conditions at the second wavelength.

Clause 5. The method of clause 2, wherein the computationally reconstructed image comprises one or more of an increased contrast or an aberration correction for the second wavelength based at least in part on the first image dataset from the first wavelength.

Clause 6. The method of clause 1, further comprising: providing the reconstructed image on a display with a first spatial frequency bandwidth and a first user perceivable color corresponding to the first wavelength and a second spatial frequency bandwidth and a second user perceivable color corresponding to the second wavelength, the first spatial frequency bandwidth greater than the second spatial frequency bandwidth and a spatial frequency bandwidth of one or more images acquired by the image sensor with the first set of illumination conditions at the first wavelength.

Clause 7. The method of clause 1, wherein the first number is larger than the second number by at least a factor of two and a second acquisition time associated with the second image dataset is no more than half of a first acquisition time associated with the first image dataset and wherein a spatial frequency bandwidth of the computationally reconstructed image is greater than a spatial frequency bandwidth of each of a plurality of images acquired with the first set of illumination conditions by at least a factor of 1.5.

Clause 8. The method of clause 1, wherein the first image dataset comprises a plurality of images of the sample and the second image dataset comprises one or more images of the sample and wherein the second image dataset comprises fewer images of the sample than the first image dataset.

Clause 9. The method of clause 1, wherein the computationally reconstructed image comprises one or more of an increased spatial frequency bandwidth, a correction for optical aberrations, or an increase in image contrast.

Clause 10. The method of clause 9, wherein the first image data set is transformed to a spatial frequency space and mapped to spatial frequencies in the spatial frequency space based on the first set of illumination conditions to provide the increased spatial frequency bandwidth of the computationally reconstructed image as compared to a first spatial frequency bandwidth of each of a plurality of images acquired with the first set of illumination conditions.

Clause 11. The method of clause 9, wherein the image sensor comprise a spatial frequency bandwidth and the increased spatial frequency bandwidth of the computationally reconstructed image is greater than the spatial frequency bandwidth of the image sensor divided by a magnification of an image of the sample onto the image sensor.

Clause 12. The method of clause 9, wherein the first image data set comprises a first plurality of images, each comprising a first spatial frequency bandwidth, and the increased spatial frequency bandwidth of the computationally reconstructed image is greater than the first spatial frequency bandwidth of said each of the first plurality of images.

Clause 13. The method of clause 12, wherein the first plurality of images comprises a feature of the sample not resolved with the first spatial frequency bandwidth of said each of the first plurality of images and the computationally reconstructed image comprises the feature of the sample resolved with the increased spatial frequency bandwidth of the computationally reconstructed image.

Clause 14. The method of clause 9, wherein the correction of optical aberrations is provided by separating aberration information from sample information, so as to decrease an effect of optical aberrations on the computationally reconstructed image and optionally wherein the aberration information comprises aberration spatial frequencies and phases associated with optics used to image the sample on the image sensor and optionally wherein the sample information comprises sample spatial frequencies and phases associated with a structure of the sample.

Clause 15. The method of clause 9, wherein the increased image contrast of the computationally reconstructed image is provided by computationally amplifying high spatial frequencies of the reconstructed image to better represent the sample.

Clause 16. The method of clause 9, wherein the computationally reconstructed image comprises the increased contrast and wherein the increased contrast comprises an increased ratio of high spatial frequencies to low spatial frequencies in the computationally reconstructed image as compared to a ratio of high spatial frequencies to low spatial frequencies of each of a plurality of images of the first image dataset.

Clause 17. The method of clause 1, wherein the first image dataset and the second image dataset are processed separately to generate a first computationally reconstructed image from the first image dataset and to generate a second computationally reconstructed image from the second dataset and wherein the first computationally reconstructed image is combined with the second computationally reconstructed image to generate the computationally reconstructed image.

Clause 18. The method of clause 1, wherein the first image dataset comprises a first plurality of images and the second image dataset comprises one or more images and wherein the first plurality of images and the one or more images are processed together to generate the computationally reconstructed image.

Clause 19. The method of clause 18, wherein the one or more images comprises a single image acquired with the second set of illumination conditions.

Clause 20. The method of clause 18, wherein the one or more images comprises a second plurality of images.

Clause 21. The method of clause 1, wherein the computationally reconstructed image comprises a color image, the color image comprising two or more of a red channel, a green channel, or a blue channel.

Clause 22. The method of clause 21, wherein the first wavelength corresponds to one of the red channel, the green channel or the blue channel and the second wavelength corresponds to another one of the red channel, the blue channel or the green channel.

Clause 23. The method of clause 22, wherein the reconstructed image is shown on the display with a first spatial frequency bandwidth for a first color channel corresponding to the first wavelength and with a second spatial frequency bandwidth for a second color channel corresponding to the second wavelength, the first spatial frequency bandwidth greater than the second spatial frequency bandwidth.

Clause 24. The method of clause 23, wherein the first wavelength comprises green light, the first channel comprises the green channel, the second wavelength comprises red light or blue light and the second color channel comprises the red channel or the blue channel and wherein the green channel is shown on the display with the first spatial frequency bandwidth and the red channel or the blue channel is shown on the display with the second spatial frequency bandwidth.

Clause 25. The method of clause 24, wherein the computationally reconstructed image comprises the red channel, the green channel and the blue channel and wherein the second wavelength comprises red light corresponding to the red channel and the third wavelength comprises blue light corresponding to the third channel wherein the third channel is shown on the display with a third spatial frequency bandwidth less than the first spatial frequency bandwidth.

Clause 26. The method of clause 21, wherein image sensor comprises a sensor comprising a two dimensional array of pixels and a first color of the first image dataset corresponds to the first wavelength and a second color of the second image dataset corresponds to the second wavelength and wherein the computationally reconstructed image and is mapped to the red channel, the green channel and the blue channel based on the first wavelength and the second wavelength.

Clause 27. The method of clause 26, wherein the image sensor comprises a grayscale image sensor comprising the two-dimensional array of pixels.

Clause 28. The method of clause 26, wherein the image sensor comprises a color image sensor comprising a two-dimensional array of pixels and a color filter array comprising a plurality of color filters arranged over the two-dimensional array.

Clause 29. The method of clause 28, wherein the first image dataset is determined based on the first wavelength and a first absorption characteristic of the color filter at the first wavelength and the second image dataset is determined based on the second wavelength and a second absorption characteristic at the second wavelength.

Clause 30. The method of clause 29, wherein the first image dataset and the second image dataset are combined in accordance with a first absorption characteristic of the color filter at the first wavelength and a second absorption characteristic of the color filter at the second wavelength in order to generate the computationally reconstructed image.

Clause 31. The method of clause 28, wherein the first wavelength is different from the second wavelength and a portion of first image dataset and a portion of the second image dataset are acquired substantially simultaneously with one or more of the set of illumination conditions illuminating the sample when the sample is illuminated with one or more of the second set of illumination conditions.

Clause 32. The method of clause 1, wherein the first wavelength is different from the second wavelength.

Clause 33. The method of clause 32, wherein the first wavelength comprises a first color and the second wavelength comprises a second color different from the first color.

Clause 34. The method of clause 32, wherein the first wavelength comprises a first peak of a first illumination source emitting a first distribution of wavelengths, the first distribution of wavelengths comprising a first full width half maximum and wherein the second wavelength comprises a second peak of a second distribution of wavelengths, the second distribution of wavelengths comprising a second full width half maximum and wherein the first full width half maximum does not overlap with the second full width half maximum.

Clause 35. The method of clause 32, wherein the first wavelength is within one of the following ranges and the second wavelength is within a different one of the following ranges: an ultraviolet range from about 200 to about 380 nanometers (nm), a violet range from about 380 to about 450 nm, a blue range from about 450 to about 485 nm, a cyan range from about 485 to 500 nm, a green range from about 500 to 565 nm, a yellow range from about 565 to about 590 nm, an orange range from about 590 to 625 nm, a red range from about 625 to about 740 nm, or a near infrared range from about 700 nm to about 1100 nm.

Clause 36. The method of clause 33, wherein the first wavelength is within one of the ranges and the second wavelength is within a different one of the ranges.

Clause 37. The method of clause 1, further comprising: acquiring, with the image sensor, a third image dataset from the sample illuminated with a third wavelength using a third set of illumination conditions; wherein the third dataset is combined with the first image dataset and the second image dataset to generate the computationally reconstructed image.

Clause 38. The method of clause 37, wherein the third set of illumination conditions comprises a third number of illumination conditions less than the first number of illumination conditions.

Clause 39. The method of clause 37, further comprising: acquiring, with the image sensor, N additional image datasets from the sample illuminated with N additional wavelengths using N additional sets of illumination conditions; wherein the N additional datasets are combined with the first image dataset, the second image dataset and the third image data to generate the computationally reconstructed image; wherein N comprises an integer of at least one.

Clause 40. The method of clause 39, wherein N comprises an integer within a range from about 10 to 100.

Clause 41. The method of clause 39, wherein the computationally reconstructed image comprises a hyperspectral image.

Clause 42. The method of clause 1, wherein the computationally reconstructed image comprises one or more of a 2D image, a 3D image, a 2D intensity image, a 3D intensity image, a 2D phase image, a 3D phase image, a 2D fluorescence image, a 3D fluorescence image a 2D hyperspectral image, or a 3D hyperspectral image.

Clause 43. The method of clause 1, wherein the first dataset and the second dataset correspond to a first depth of the sample, the method further comprising: adjusting a focus of the microscope to image the sample at a plurality of depths; and repeating the steps of acquiring and combining to generate the computationally reconstructed image, the computationally reconstructed image comprising a plurality of computationally reconstructed images at different depths corresponding to the plurality of depths.

Clause 44. The method of clause 1, further comprising determining the first wavelength.

Clause 45. The method of clause 44, wherein the first wavelength is user-defined.

Clause 46. The method of clause 44, wherein determining the first wavelength further comprises: acquiring, with the image sensor, an initial image dataset of the sample illuminated with a plurality of wavelengths; determining that a first image of the initial image dataset includes more information than a second image of the initial image dataset; selecting, as the first wavelength, a first wavelength of the plurality of wavelengths corresponding to the first image; and selecting, as the second wavelength, a second wavelength of the plurality of wavelengths corresponding to the second image.

Clause 47. The method of clause 46, wherein the information comprises spatial frequency information.

Clause 48. The method of clause 46, further comprising determining the first set of illumination conditions based on information identified from the initial image dataset.

Clause 49. The method of clause 48, wherein determining the first set of illumination conditions comprises determining one or more of a number of light sources, a location of light sources, a combination of locations of a plurality of light sources, an illumination angle, a combination of illumination angles, a number of illuminations, a position of a diffuser, a pattern of light, a filter, a mask, or a focus of the sample.

Clause 50. The method of clause 46, further comprising determining a computational process for reconstructing the first image based on the initial image dataset.

Clause 51. The method of clause 1, wherein the computationally reconstructed image comprises a three-dimensional image.

Clause 52. The method of clause 1, wherein the second set of illumination conditions differs from the first set of illumination conditions.

Clause 53. The method of clause 1, wherein the second image dataset is smaller than the first image dataset.

Clause 54. The method of clause 1, wherein the first image dataset is acquired after the second image dataset.

Clause 55. A microscope for image reconstruction, comprising: an illumination source configured to illuminate a sample with a plurality of wavelengths at a plurality of angles; an image sensor; an objective lens to image the sample illuminated with the illumination assembly onto the image sensor; and a processor operatively coupled to the illumination assembly and the image sensor, the processor configured with instructions to perform the method of any one of the preceding clauses.

Clause 56. The microscope of clause 55, wherein the plurality of wavelengths comprises one or more of a violet wavelength within a range from about 380 to about 450 nanometers (nm), a blue wavelength within a range from about 450 to about 485 nm, a cyan wavelength within a range from about 485 to 500 nm, a green wavelength within a range from about 500 to 565 nm, a yellow wavelength within a range from about 565 to about 590 nm, an orange wavelength within a range from about 590 to 625 nm, a red wavelength within a range from about 625 to about 740 nm, an infrared wavelength greater than 700 nm, or a near infrared wavelength within a range from about 700 nm to about 1100 nm.

Clause 57. The microscope of clause 55, wherein the illumination assembly is configured to illuminate the sample with a plurality of light sources at a plurality of locations corresponding to different illumination angles of the sample.

Clause 58. The microscope of clause 55, further comprising a focus actuator coupled to the processor to adjust a depth of the sample used to form an image of the sample on the image sensor.

Clause 59. The microscope of clause 58, wherein the focus actuator is configured to move to a first configuration to image the sample at a first depth and to move to a second configuration to image the sample at a second depth.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method for generating a computationally reconstructed image, comprising:
    acquiring, with an image sensor, a first image dataset from a sample illuminated using a first set of illumination conditions comprising a first number of illumination conditions each comprising a first wavelength, the first image dataset comprising a plurality of images comprising a first spatial frequency bandwidth;
    acquiring, with the image sensor, a second image dataset from the sample illuminated using a second set of illumination conditions comprising a second number of illumination conditions, each comprising a second wavelength, the second image dataset comprising one or more images comprising a second spatial frequency bandwidth, wherein the first number of illumination conditions is larger than the second number of illumination conditions; and
    combining the first image dataset and the second image dataset into a computationally reconstructed image of the sample, wherein the computationally reconstructed image comprises a spatial frequency bandwidth greater than the first spatial frequency bandwidth of the first image dataset and the second spatial frequency bandwidth of the second image dataset.

2. The method of claim 1, wherein the first spatial frequency bandwidth corresponds to the first wavelength and the second spatial frequency bandwidth corresponds to the second wavelength, and wherein the first spatial frequency bandwidth is greater than the second spatial frequency bandwidth.

3. The method of claim 2, wherein the computationally reconstructed image comprises one or more of an increased contrast or an aberration correction for the second wavelength based at least in part on the first image dataset from the first wavelength.

4. The method of claim 1, further comprising:
    providing the reconstructed image on a display with the first spatial frequency bandwidth and a first user perceivable color corresponding to the first wavelength and the second spatial frequency bandwidth and a second user perceivable color corresponding to the second wavelength, the first spatial frequency bandwidth greater than the second spatial frequency bandwidth and a spatial frequency bandwidth of the plurality of images acquired by the image sensor with the first set of illumination conditions at the first wavelength.

5. The method of claim 1, wherein the first number is larger than the second number by at least a factor of two and a second acquisition time associated with the second image dataset is no more than half of a first acquisition time associated with the first image dataset and wherein the spatial frequency bandwidth of the computationally reconstructed image is greater than a spatial frequency bandwidth of each of a plurality of images acquired with the first set of illumination conditions by at least a factor of 1.5.

6. The method of claim 1, wherein the computationally reconstructed image comprises one or more of a correction for optical aberrations, or an increase in image contrast.

7. The method of claim 6, wherein the image sensor comprise a spatial frequency bandwidth and the spatial frequency bandwidth of the computationally reconstructed image is greater than the spatial frequency bandwidth of the image sensor divided by a magnification of an image of the sample onto the image sensor.

8. The method of claim 6, wherein each of the first plurality of images comprises the first spatial frequency bandwidth, and the spatial frequency bandwidth of the computationally reconstructed image is greater than the first spatial frequency bandwidth of said each of the first plurality of images.

9. The method of claim 6, wherein the correction of optical aberrations is provided by separating aberration information from sample information, so as to decrease an effect of optical aberrations on the computationally reconstructed image.

10. The method of claim 6, wherein the increased image contrast of the computationally reconstructed image is provided by computationally amplifying high spatial frequencies of the reconstructed image to better represent the sample.

11. The method of claim 1, wherein the plurality of images and the one or more images are processed together to generate the computationally reconstructed image.

12. The method of claim 1, wherein the computationally reconstructed image comprises a color image, the color image comprising two or more of a red channel, a green channel, or a blue channel.

13. The method of claim 12, wherein the first wavelength corresponds to one of the red channel, the green channel or the blue channel and the second wavelength corresponds to another one of the red channel, the blue channel or the green channel.

14. The method of claim 13, wherein the computationally reconstructed image is shown on a display with the first spatial frequency bandwidth for a first color channel corresponding to the first wavelength and with the second spatial frequency bandwidth for a second color channel corresponding to the second wavelength, the first spatial frequency bandwidth greater than the second spatial frequency bandwidth.

15. The method of claim 14, wherein the first wavelength comprises green light, the first channel comprises the green channel, the second wavelength comprises red light or blue light and the second color channel comprises the red channel or the blue channel and wherein the green channel is shown on the display with the first spatial frequency bandwidth and the red channel or the blue channel is shown on the display with the second spatial frequency bandwidth.

16. The method of claim 15, wherein the computationally reconstructed image comprises the red channel, the green channel and the blue channel and wherein the second wavelength comprises red light corresponding to the red channel and a third wavelength comprises blue light corresponding to a third channel wherein the third channel is shown on the display with a third spatial frequency bandwidth less than the first spatial frequency bandwidth.

17. The method of claim 1, further comprising determining the first wavelength.

18. The method of claim 17, wherein the first wavelength is user-defined.

19. The method of claim 17, wherein determining the first wavelength further comprises:
- acquiring, with the image sensor, an initial image dataset of the sample illuminated with a plurality of wavelengths;
- determining that a first image of the initial image dataset includes more information than a second image of the initial image dataset;
- selecting, as the first wavelength, a first wavelength of the plurality of wavelengths corresponding to the first image; and
- selecting, as the second wavelength, a second wavelength of the plurality of wavelengths corresponding to the second image.

20. A microscope for image reconstruction, comprising:
- an illumination assembly configured to illuminate a sample with a plurality of wavelengths at a plurality of angles;
- an image sensor;
- an objective lens to image the sample illuminated with the illumination assembly onto the image sensor; and
- a processor operatively coupled to the illumination assembly and the image sensor, the processor configured with instructions to perform the method of claim 1.

21. The method of claim 1, wherein the first number of illumination conditions comprises a plurality of angles.

* * * * *